(12) United States Patent
Hillis et al.

(10) Patent No.: US 12,719,831 B2
(45) **Date of Patent: *Aug. 25, 2026**

(54) SECURE COMMUNICATION SYSTEM

(71) Applicant: Applied Invention, LLC, Burbank, CA (US)

(72) Inventors: W. Daniel Hillis, Rindge, NH (US); David C. Douglas, Concord, MA (US); Mathias Kolehmainen, Louisville, KY (US); Steven Willis, Cambridge, MA (US); Frank Kastenholz, Medford, MA (US); Michael Dubno, New York, NY (US)

(73) Assignee: APPLIED INVENTION, LLC, Burbank, CA (US)

( * ) Notice: Subject to any disclaimer, the term of this patent is extended or adjusted under 35 U.S.C. 154(b) by 308 days.

This patent is subject to a terminal disclaimer.

(21) Appl. No.: 18/161,015

(22) Filed: Jan. 27, 2023

(65) Prior Publication Data

US 2023/0171228 A1 Jun. 1, 2023

Related U.S. Application Data

(63) Continuation of application No. PCT/US2021/070999, filed on Jul. 27, 2021.

(Continued)

(51) Int. Cl.
*H04L 9/40* (2022.01)

(52) U.S. Cl.
CPC .......... *H04L 63/0245* (2013.01); *H04L 63/20* (2013.01)

(58) Field of Classification Search
None
See application file for complete search history.

(56) References Cited

U.S. PATENT DOCUMENTS 7,027,773 B1 * 4/2006 McMillin ................ H04L 45/00 455/445
7,962,750 B1 6/2011 Gruse et al.
(Continued)

FOREIGN PATENT DOCUMENTS

EP 1435718 A2 3/2010
JP 2004172865 A * 6/2004
JP 2005505946 A * 2/2005 ............ H04L 61/30

OTHER PUBLICATIONS

Deborah Estrin et al., "Visa protocols for controlling interorganizational datagram flow", IEEE Journal on Selected Areas in Communications, US, vol. 7, No. 4, May 1, 1989 (May 1, 1989), pp. 486-498, ISSN: 0733-8716, DOI: 10.1109/49.17712.

*Primary Examiner* — Glenton B Burgess
(74) *Attorney, Agent, or Firm* — Perkins Coie LLP; Michael Glenn; Vikram Iyengar

(57) ABSTRACT

Methods, devices, and system related to secure communication systems are disclosed. In one example aspect, a secure communication system enabling secure transport of information includes a secure network comprising one or more nodes communicatively coupled by an internal communication system and a set of policies. The secure network internally transports the information in the form of internal packets. Each of the internal packets is associated with a visa that references the policies. A node among said one or more nodes transmits an internal packet of said information only if allowed by said policies as referenced by said visa.

27 Claims, 14 Drawing Sheets

Related U.S. Application Data

(60) Provisional application No. 63/057,875, filed on Jul. 28, 2020.

(56) References Cited

U.S. PATENT DOCUMENTS

| | | | | |
|---|---|---|---|---|
| 8,185,944 | B2 * | 5/2012 | Schnackenberg | H04L 63/105 713/153 |
| 8,495,721 | B1 | 7/2013 | Moody et al. | |
| 9,215,075 | B1 | 12/2015 | Poltorak | |
| 9,930,012 | B1 * | 3/2018 | Clemons, Jr. | H04L 63/0236 |
| 10,652,281 | B1 | 5/2020 | Moolenaar et al. | |
| 2005/0021724 | A1 | 1/2005 | Kung et al. | |
| 2007/0250713 | A1 | 10/2007 | Rahman et al. | |
| 2010/0214943 | A1 | 8/2010 | Immendorf et al. | |
| 2011/0128389 | A1 | 6/2011 | Maeda et al. | |
| 2011/0222449 | A1 | 9/2011 | Goldberg et al. | |
| 2012/0287879 | A1 | 11/2012 | Nentwig | |
| 2013/0120597 | A1 | 5/2013 | Sakai et al. | |
| 2013/0322329 | A1 | 12/2013 | Visuri et al. | |
| 2013/0331097 | A1 | 12/2013 | Kang et al. | |
| 2014/0109175 | A1 | 4/2014 | Barton et al. | |
| 2014/0115668 | A1 | 4/2014 | Stuntebeck et al. | |
| 2014/0188738 | A1 | 7/2014 | Huxham | |
| 2015/0086020 | A1 | 3/2015 | Harjula et al. | |
| 2015/0200928 | A1 | 7/2015 | Burch et al. | |
| 2015/0254677 | A1 | 9/2015 | Huxham et al. | |
| 2015/0372875 | A1 | 12/2015 | Turon et al. | |
| 2016/0248682 | A1 | 8/2016 | Lee et al. | |
| 2016/0330220 | A1 | 11/2016 | Dulkin et al. | |
| 2016/0330222 | A1 | 11/2016 | Brandt et al. | |
| 2016/0359915 | A1 | 12/2016 | Gupta et al. | |
| 2017/0163606 | A1 | 6/2017 | Yin | |
| 2017/0279805 | A1 | 9/2017 | Diaz-Cuellar et al. | |
| 2017/0324652 | A1 | 11/2017 | Lee et al. | |
| 2018/0109554 | A1 | 4/2018 | Reddy et al. | |
| 2018/0302479 | A1 | 10/2018 | Kolbe et al. | |
| 2018/0375850 | A1 | 12/2018 | Hillis | |
| 2018/0375866 | A1 | 12/2018 | Hillis et al. | |
| 2019/0089678 | A1 * | 3/2019 | Lam | H04L 63/0263 |
| 2019/0342859 | A1 * | 11/2019 | Rubin | H04W 4/12 |
| 2021/0058369 | A1 | 2/2021 | Hillis et al. | |
| 2021/0321258 | A1 * | 10/2021 | Salkintzis | H04W 12/102 |
| 2022/0368688 | A1 | 11/2022 | Hillis et al. | |

* cited by examiner

SECURE COMMUNICATION SYSTEM

CROSS-REFERENCE TO RELATED APPLICATIONS

This application is a continuation of International Application No. PCT/US2021/070999 filed Jul. 27, 2021, which claims priority to U.S. Patent Application No. 63/057,875 filed Jul. 28, 2020. The aforementioned applications are incorporated herein by reference in their entirety.

BACKGROUND OF THE INVENTION

Technical Field

The present disclosure pertains to the field of communication and, in particular, secure communication networks.

Background

Most existing network protocols were not originally designed with the expectation that malicious actors would have access to the network. For example, on the Internet, the general philosophy is to allow all connected users and devices to communicate. As explained in the Internet Engineering Task Force's 1996 Architectural Principles of the Internet, "confidentiality and authentication are the responsibility of end users and must be implemented in the protocols used by the end users". Because of this lack of authentication, it is often impossible to know who originated a packet received via the Internet.

For this and other reasons, even using state-of-the-art best practices, protecting the online resources of an organization is extremely difficult to do perfectly. A single security weakness can cause catastrophic data losses, thefts, and shut down of critical functions. Denial of service attacks, insider attacks, and malware are especially difficult for organizations that support heterogonous software environments or multiple clouds and for organizations where users are a mix of employees, contractors, and vendors accessing the services from locations physically outside of company properties. Most organizations rely on properly configured firewalls and VPNs to protect against outside attacks.

However, it is difficult to configure the firewalls in a way that enables legitimate communication outside the enclave without opening holes that can be exploited by attacks. And even if the firewall operates perfectly, the protected enclave remains vulnerable to attack from within—by an insider or by a rogue software entity such as a computer virus that penetrates the enclave, for example through an email attachment or USB drive. Most large organizations accept that network security breaches are likely and use monitoring and auditing tools to catch them and stop them as quickly as possible when they inevitably occur.

Figure 1:
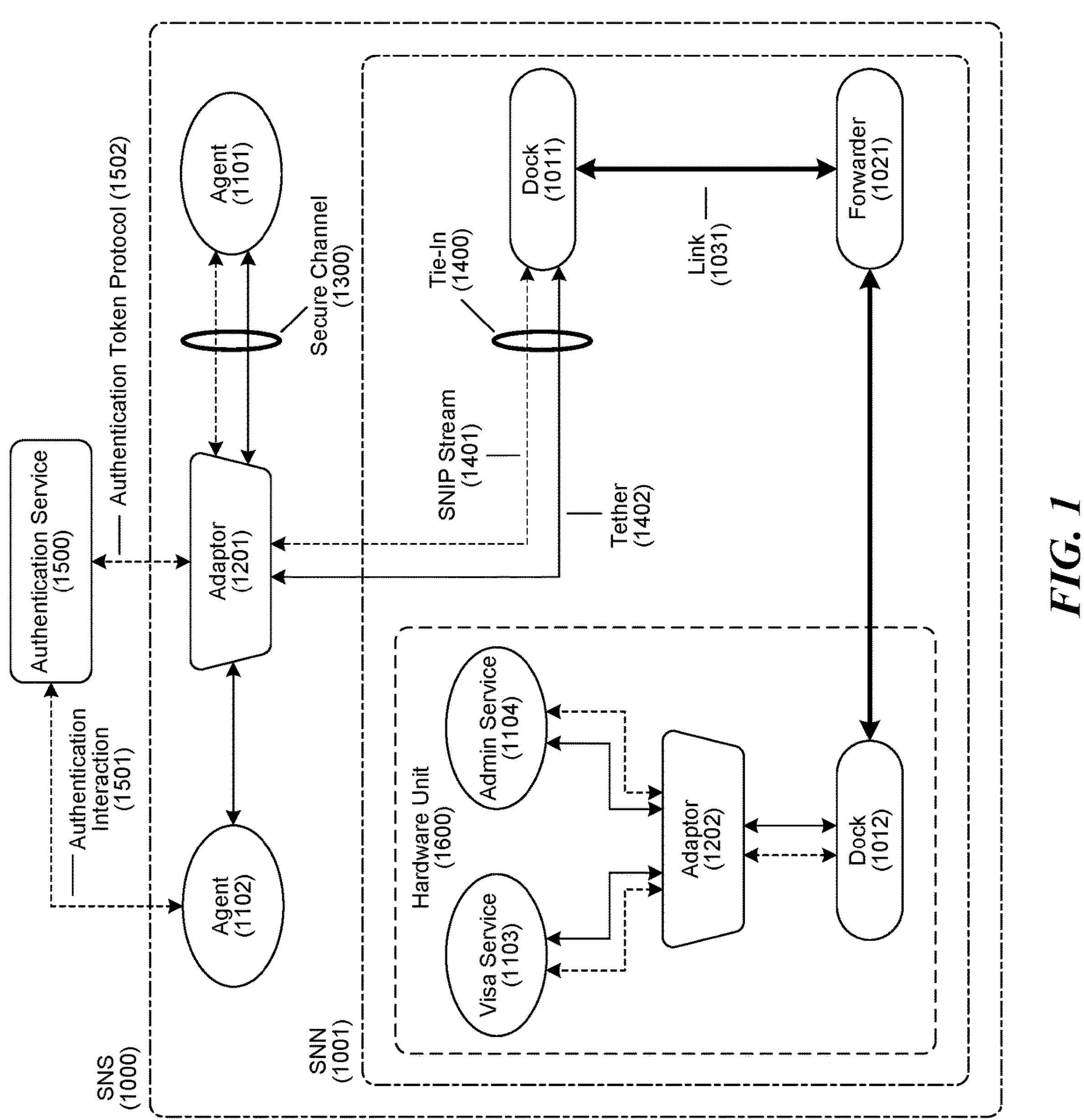
FIG. 1 shows an exemplary SNS in which two agents authenticate and connect to a minimal SNN with a visa service and admin service on a single hardware unit, in accordance with an embodiment of the present disclosure.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

System Overview

The disclosed techniques relate to a secure communication system, called the selective network system (SNS), based on a secure network, called the selective node network (SNN). The SNS consists of the SNN, agents, adaptors, a means of agent-adaptor communication for each agent, and a means of adaptor-SNN communication for each adaptor. Agents may be, for example, people, devices, software services, or combinations of these, such as a person using a device. One or more of the agents serve as admins of the SNS that determine the configuration of the SNN, including the policies enforced by the SNN. Agents connect to the SNN via adaptors that facilitate the authentication of the agents by the SNN and transmit and receive the agent's communications through the SNN. Each of the agents has an identity and access to a set of credentials that can be used to authenticate attributes of that identity.

The purpose of a SNS is to allow authenticated agents to communicate with one another securely, if and only if they are allowed to do so by the policies. The policies are automatically enforced by the SNN. All communication between agents is blocked throughout the SNN, not just at the edges of the SNN, unless it is explicitly allowed by the policies. Some adaptors are used for internal communication with SNN services within the SNN, but no other adaptor is a part of the SNN nor is it required to be under the control of the admins. The SNN does not rely upon adaptors to enforce the policies. The policies may reference the identity of the agents; the authentication of attributes of the agent's identity; the time, the location, the bandwidth and volume of a communication; the port numbers and packet protocols used for a communication; trust evaluations provided by a trust evaluation service; and the availability of specific pools of resources within the SNN.

A SNS makes use of secure channels, which are means of transmitting information between two endpoints that are resistant to eavesdropping and tampering. A secure channel may be implemented by a protected hardwired electrical or optical connection, by an internal hardware connection such as a data bus, register or shared memory, or by a secure communications session established through a network. A secure channel may also be reliable, in the sense that it is protected against internal loss or corruption of the transmitted information. A reliable, secure channel is either implemented on an internal hardware connection within a hardware unit, or through a connection between hardware units that has a means of detecting and retransmitting lost or corrupted information.

Methods for establishing secure channels are familiar in the art. A SNS utilizes some of these methods, but it also uses a novel method to establish a secure channel between adapters called a compliant flow. The SNN within the SNS automatically establishes a compliant flow to transmit packets between adaptors by associating each packet of the compliant flow with a certificate called a visa that may be valid during the time the packet transits the network. The visa associated with a packet, referred to as the packet's visa, specifies the procedures that govern the processing of the packet and enforce policies on compliant flows each time a packet is forwarded. This allows the enforcement of policies to reflect changing conditions and changing policy. This contrasts with conventional network sessions, where policy is typically enforced only at the time a new session is established.

Agents communicate with the SNN through reliable, secure channels called tie-ins. Each agent communicates with the SNN through an adaptor that associates the agent's communications with an authenticated identity. Allowed communication packets travel from a source agent to its adaptor; through a tie-in to the SNN, where policies specified by the associated visa are enforced each time the packet is forwarded within the SNN; back through a tie-in to an adaptor; and finally, to a destination agent. The adaptor may also communicate with the SNN through a tie-in to assist in authenticating the identity of an agent that communicates through it.

Tie-ins utilize the means of adaptor-SNN communication. When that means is not itself a reliable, secure channel, a reliable, secure session is established using that means in conjunction with methods known in the art for establishing and maintaining reliable, secure channels. In the preferred embodiment of the invention, the means of adaptor-SNN communication may be a standard IP network, in which case the method for establishing and maintaining reliable, secure channels is the QUIC protocol.

The policies enforced by the SNN are set by admins, which are agents that have access to a special set of tools, SNN services, and credentials that allow them to administer the SNN through the SNN. The admins describe policies in a policy specification that is expressed in a formal policy description language. The policy specification defines multiple categories of policy that govern the activity of a SNS, including communication policies, authentication policies, connection policies, and reporting policies. Communication policies define which agents can communicate and under what circumstances and what resources they are allocated to do so. Authentication policies define how and when agents may authenticate their identities. Connection policies define how the SNN establishes and maintains internal links and tie-ins. Reporting policies define how and when information such as network events are directly reported or logged. Any of these policies may depend on a trust evaluation service that evaluates trust in agents and other system components.

An SNS may make use of services that are not part of the SNN, such as a domain name service (DNS) and a trust evaluation service. These services may communicate through the SNN as agents.

SNN Overview

A SNN consists of a set of nodes, a visa service, an admin service, hardware-related services, and an internal communication system that allows the services to communicate with the nodes and the nodes to communicate with one another. Some nodes, called docks, can establish tie-ins with adaptors that allow agents to communicate through and within the SNN. Some docks are gateways to the SNN, and other docks are internal docks that allow internal services to communicate through the SNN as agents. The internal services each have an internal adaptor with a means to communicate with an internal dock. Every dock has a means of communicating with its connected adaptors to assist in determining and authenticating the identity of agents that communicate through those adaptors. Other nodes, called forwarders, connect only to other nodes.

Every node has an associated hardware unit that implements its functions. Multiples nodes may be implemented on a single hardware unit. The visa service and admin service have one or more associated hardware units that implement their functions. A hardware unit may also implement a hardware-related service. Each hardware unit includes a clock to keep track of the time. Part of the internal communication system may also be implemented within a hardware unit, and part of it may be implemented by an internal network, such as a wired or wireless IP network, or by other connections between hardware units. Hardware units may be specialized devices, packet-processing routers, or general-purpose computers, with or without specialized packet switching hardware.

The function of a SNN is to allow the establishment of tie-ins to docks, to transport packets securely between those tie-ins when allowed by the policies and block the transport of all other packets, and to enable the determination and authentication of the identity of agents communicating through tie-ins. The nodes communicate among themselves through the internal communication system over secure communication channels called links. Each node is connected through links to all other nodes, either directly or through other nodes. Each dock is connected directly by a link to one forwarder. Thus, every SNN includes a dock, a forwarder and a link between them.

A dock receives an agent packet from an adaptor through a tie-in, converts it to an internal packet that is associated with a visa, and transmits this internal packet to a forwarder. A forwarder either transmits a packet to another node or discards it. Both dock and forwarders enforce policies. In the preferred embodiment, agent packets are either IPv4 or IPv6 packets.

Each internal packet is associated with a visa that specifies what procedures should be applied when a node processes the packet, ensuring that the communication policies are enforced and that the packet is transmitted to the appropriate address(es). A packet will be discarded unless these procedures indicate that it should be transmitted.

The admin service manages configurations of the SNN, manages other SNN services, receives reporting from SNN and other SNN services, and keeps clocks on all hardware units synchronized within policy-determined tolerances. The admin service is connected by a reliable secure channel to each hardware-related service, to each node, and to at least one admin. The admins use trusted tools to compile the policy specifications into the format required by the admin service. They are communicated to the admin service using the Selective Network Administrative Protocol (SNAP).

The visa service issues visas upon request from a dock and may issue visas before activation of a configuration. The visa service is connected by a reliable secure channel to each dock. The visa service is preferably implemented in a distributed manner across multiple hardware units.

In the preferred embodiment of the invention, the admin service, the visa service, and the hardware-related services are internal agents within the SNN, and nodes use pre-issued visas to establish secure channels to them through the SNN. A reliable, secure channel is then established through that secure channel by methods known in the art, such as the TCP protocol, and the admin service keeps clocks on all hardware units synchronized using the Network Time Protocol. Each hardware unit's hardware-related service establishes reliable, secure channels to the admin service and visa service. The hardware-related service uses these channels in conjunction with a means of communication internal to the hardware unit to establish reliable, secure channels between the services and the nodes implemented on the hardware unit.

To maintain control of the programming of the SNN, the admins have means to control the initial state of all hardware units that implement the SNN. This initially includes the initial run-time state, the state of any programmable memory, the firmware, the initial software, or other programming. In this initial state, the hardware units will be able to establish an initial reliable, secure connection to the admin service either internally or though the SNN, and the admins will be able to establish an initial reliable, secure startup channel to the admin service. Communications between an admin and the admin service always use SNAP. The startup channel may use agent-to-agent communication through the SNN. Once these connections are established, an admin can communicate with the admin service to define and activate an initial configuration that includes the hardware unit and SNN components it implements, and the startup channel is disabled.

Agents and Identities

Agents are the entities that policies allow to communicate via the SNN. These permissioned agents may be people, devices, services, and combinations of these, such as the combination of a service and the specific hardware device that it runs on, or a person and a specific type of device. The core function of a SNS is to enable agents to communicate when allowed to do so by policies. Each agent has at least one associated agent address, which is preferably an IP address, which it uses for communication through the SNS.

The identity of an agent is a set of attribute/value pairs. Attributes of an identity may include information such as the location of the agent and the devices through which the agent is communicating with the SNN. For example, one of the attributes of an agents that is the combination of a person and a computer may be TYPE, with value EMPLOYEE-USING-MANAGED-LAPTOP. Other attributes of this agent may include EMPLOYEE-ID and LAPTOP-SERIAL-NUMBER. In the case of an agent that is a server, for example a web server, one of the attributes may be URL, with a value that is the Uniform Resource Locator of the service.

The policies of the SNS determine when attributes of the identity of an agent need to be authenticated and how they may be authenticated. Depending on the attributes within the identity, the agent may be expected to demonstrate, via the adaptor, access to credentials that can authenticate the claimed combination of attributes. Alternatively, a trusted service may be asked to authenticate attributes of the agent's identity and provide a cryptographically signed certificate certifying that the attributes have been authenticated in association with other attributes of the identity.

In the example above, the policies for authenticating LAPTOP-SERIAL-NUMBER may require authentication through the device's Trusted Platform Module (TPM) and the policies for authenticating the EMPLOYEE-ID may require a face recognition scan. The adaptor can challenge the agent through protocols that are determined by the specific interfaces between the agent and the adaptor or it may authenticate the identity with the assistance of a trusted authentication service, which is not necessarily part of the SNS.

An agent, such as an admin, may have attributes that require the cooperation of multiple individuals, or multiple individuals having access to specific devices, to authenticate. These can be used advantageously to ensure that a single individual with administrative privileges cannot administer the network without the cooperation of other individuals with administrative privileges. The admin service may use different addresses for different types of operations, and policies may require different combinations of authentications to access these different types of operations.

Exemplary System Topology

The components of a SNS and the relationships between them may be better understood by way of example. FIG. 1 shows an exemplary SNS in which two agents authenticate and connect to a minimal SNN with a visa service and admin service on a single hardware unit, according to an embodiment of the invention. In FIG. 1, dashed lines represent authentication communications and solid lines represent the transmission of packets.

In the exemplary SNS 1000, a first agent 1101 connects to an adaptor 1201 through a secure channel 1300 with two streams. One stream allows the agent to authenticate directly through the adaptor; the second stream transmits agent packets between the agent and adaptor. A second agent 1102 connects to an adaptor 1202 through a secure channel with a single stream. The second agent authenticates with the adaptor via a third-party authentication service 1500. The second agent and the authentication service engage in an authentication interaction 1501 that, if successfully completed, allows the authentication service to authenticate the second agent to the adaptor via authentication token protocol 1502.

The adaptor of the first and second agent connects to the SNN 1001 via a tie-in 1400 to a dock 1011. The tie-in includes two streams. A SNIP stream 1401 (described later) allows the agent to authenticate through the adaptor; a tether 1402 (described later) transmits agents packets between the adaptor and dock. The dock is connected to a forwarder 1021 via a link 1031. Another link connects the forwarder to a second dock 1012 that is implemented on a hardware unit 1100. The hardware unit also implements the visa service 1103 and admin service 1104 of the SNN. The visa service and admin service are agents, connecting to the second dock 1201 via an adaptor 1202. The adaptor is also implemented on the hardware unit. Accordingly, one or more communication buses within the hardware unit may serve as the secure channels connecting the visa service and admin service to the adaptor and establishing the tie-in connecting the adaptor to the dock. The visa service and admin service may both send agent packets and authenticate over these internal communication buses.

Figure 2:
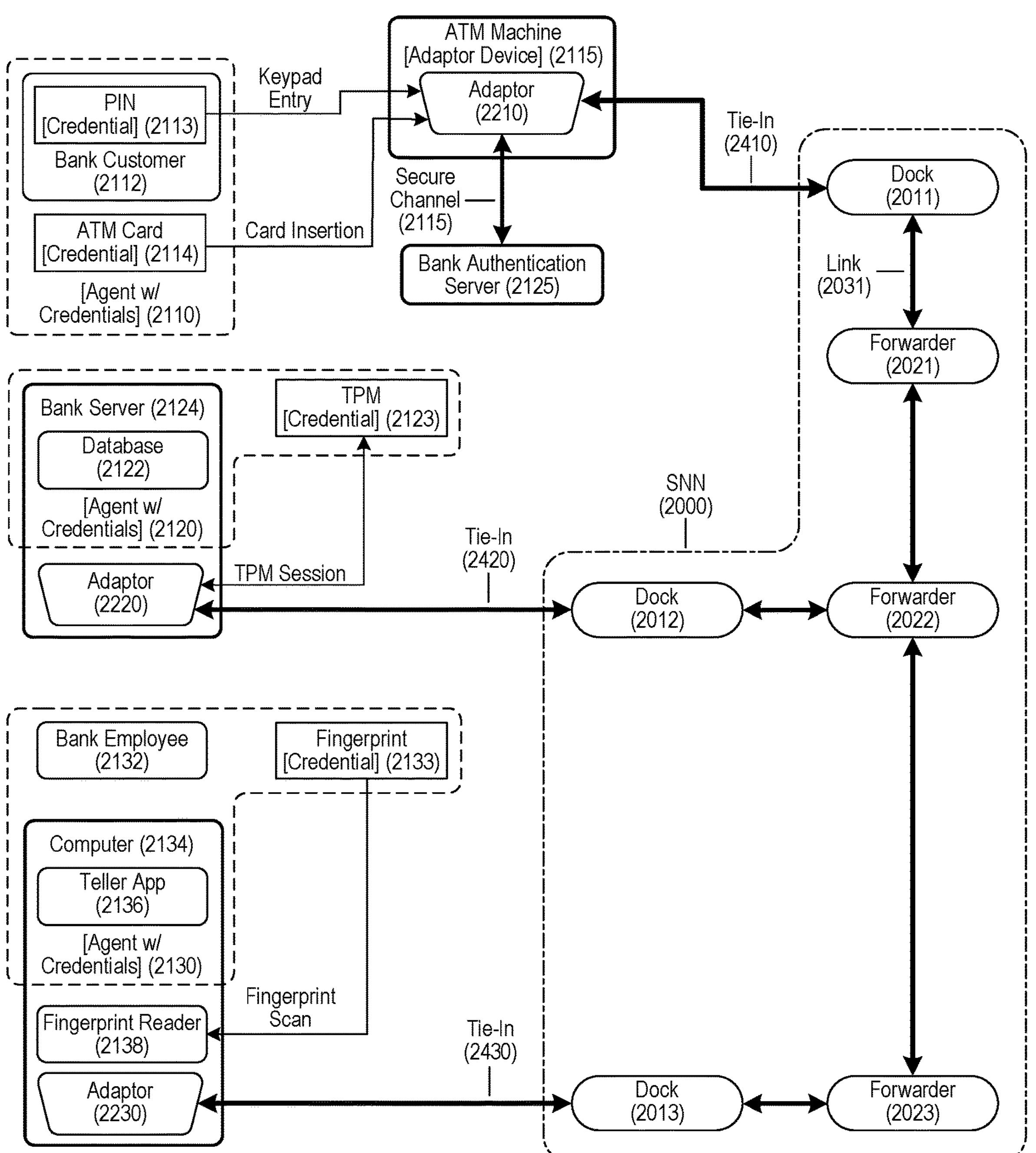
FIG. 2 shows a more specific exemplary SNS in which a SNN supports secure communication between a bank database, bank employee, and bank customer, in accordance with an embodiment of the present disclosure.

FIG. 2 shows a more specific exemplary SNS in which a SNN supports secure communication between a bank database, bank employee, and bank customer, according to an embodiment of the invention. In the exemplary system of FIG. 2, the SNN 2000 comprises six nodes including three docks and three forwarders 2021, 2022, and 2023. The nodes are connected by links; for example, dock 2011 is connected to forwarder 2021 by link 2031.

One of the docks 2011 serves a credentialed agent 2110 that is a bank customer 2112 with knowledge of a PIN 2113 and possession of an ATM card 2114. The agent connects to the SNN through an adaptor 2210 within an ATM machine 2115 (an adaptor device). The adaptor establishes a tie-in 2410 to the dock 2011. The adaptor facilitates authentication of the agent's identity through keypad entry of the PIN and card insertion of the ATM card. To verify the attributes of these credentials, the adaptor relies upon a bank authentication server 2215, external to the SNS, with which it communicates through a secure channel 2115.

Another of the docks 2012 serves a credentialed agent 2120 that is a database 2122 hosted on a bank server 2124 with a trusted platform module (TPM) 2123. The agent connects to the SNN through an adaptor 2220 that also resides on the bank server. The adaptor establishes a tie-in 2420 to the dock 2012. The adaptor facilitates authentication of the agent's identity through a TPM session with the TPM.

Finally, a third dock 2013 serves a credentialed agent 2130 that is a bank employee 2132 using a teller application 2136 running on a computer 2134. The agent connects to the SNN through an adaptor 2230 that also resides on the computer. The adaptor establishes a tie-in 2430 to the dock 2013. The adaptor facilitates authentication of the agent's identity through a fingerprint scan by a fingerprint reader 2138.

Packet Format Overview

A SNN processes at least two types of packets—agent packets that are the packets that enter and exit the SNN through docks, and internal packets that move between nodes across links. Agent packets are addressed with agent addresses of the source and destination agents. As they pass through a dock, agent packets are converted to and from internal packets that carry them as encapsulated agent packets. Internal packets become associated with a visa when they are converted from agent packets, and that association is carried with them as they travel through the SNN.

An internal packet includes a header and a payload. The internal packet header includes a packet type and a visa identifier. One type of internal packet, called a transit packet, carries information sufficient to reconstruct an agent packet that is communicated through the SNN as an encapsulated agent packet. Other types of internal packets may be used to distribute visas. The packet formats, visa identifiers, and visas are described in more detail below.

Adaptors, Tie-Ins, and Tethers

An adaptor serves as the intermediary between agents and a SNN. An adaptor has a means of communicating with each agent that connects through it and a means for authenticating attributes of the agent's identity. A variety of suitable means of communication can be used between adaptor and agent, many of which are familiar in the state of the art. In the preferred embodiment, the means of communication is either local sockets API invocation on shared hardware or a network-style communication using the Internet Protocol. The latter can be local within a system or over an external network, which may be the same as the means of adaptor-SNN communication.

Communication between an adaptor and a SNN takes place through the adaptor's tie-in. Once the tie-in is established it is used for all communication between the adaptor and a dock of the SNN. Some of this communication may be transmitted using the Selective Network Interface Protocol (SNIP). SNIP enables an adaptor to establish streams of communication through a tie-in and to cooperate with a dock in determining and authenticating the identities of agents that transmit information through the adaptor.

A tie-in is established through the means of adaptor-SNN communication to a dock of the SNN. If the means of adaptor-SNN communication is a network, it may include a means for an adaptor to receive the network address of the address of the dock, such as through a domain name system (DNS). If the means of adaptor-SNN communication is not reliable and secure, the adaptor can establish a reliable, secure channel for the tie-in by establishing a secure communication session using protocols familiar in the art. For example, in the preferred embodiment of the invention, the means of adaptor-SNN communication is an IP network and the tie-in is a secure communication session established through that network using the QUIC protocol. In other embodiments, where the adaptor and dock are different processes on the same processor, the tie-in may be established through inter-process communication. Where the adaptor and dock are implemented as functional modules with the same hardware unit, the tie-in may be implemented as an internal hardware connection.

The polices may require some form of an authentication handshake between the adaptor and the dock to establish a tie-in. If the means of adaptor-SNN communication is not itself a reliable, secure channel, the dock may use methods known in the art to limit the resources it uses in handling requests to establish tie-ins. For example, it may ignore such requests for a certain period after it handles a request, or it may demand a digital coin or an easily verified proof of work from the adaptor for each tie-in request.

An additional method for preventing a third party from interfering with an adaptor's tie-in, when the means of adaptor-SNN communication is a network, is to change the network address of the dock used for the tie-in in a manner that can only be predicted with access to a secret shared between the adaptor and dock. In one variation of this method, the network address of the dock changes at the end of each of a series of prearranged time intervals. At the end of each interval, the next address is generated by encrypting, with the shared secret, a number associated with the next time interval. The resulting ciphertext is used as an index to locate the next address from within a group of addresses reserved at the dock. The dock will support tie-ins at the next address only during the next interval, and during a change-over period before the expiration of the current interval. An adaptor that has already established a previous tie-in can establish a new tie-in at the next address during the change-over period and then use SNAP through the current tie-in to switch agent communications to the new tie-in and disestablish the current tie-in.

A tie-in may be established to a dock when the adaptor system is first initialized or is woken up, similar to other network interfaces. A tie-in persists until it fails or is disestablished by the adaptor or the dock under circumstances specified by the policies. If the tie-in fails or is otherwise disestablished, it is reestablished when the adaptor or dock needs to communicate.

An adaptor handles agent packets to and from the agents that connect through it. Each agent packet an adaptor transmits into the SNN through a tie-in is associated with a source address specified in the header of the agent packet. Each agent does not necessarily use a single agent address and each agent address is not necessarily only associated with a single agent. When multiple agents using the same agent address are connected to the SNN via the same tie-in, packets addressed to different agents may use different fields in the agent packet such as port numbers and protocols, to distinguish among the agents. The adaptor may then deliver packets to the proper agent based on these fields.

Once an adaptor has transmitted an agent packet through a tie-in using a particular agent address as a source address, other agents will be able to respond to that agent at that agent address. It is also possible for the adaptor to use SNIP to inform the SNN that an agent with a specific agent address can be contacted at its dock. In some embodiments of the invention, an agent can inform the SNN that it is available to receive packets addressed to a specific agent address by transmitting an agent packet from that specific address to a reserved NULL address through the adaptor.

Each tie-in can have one or more distinguishable streams of communication that pass through the tie-in. Each tie-in that uses SNIP has at least one stream, called its SNIP stream, that is used by the adaptor to communicate using SNIP. As noted above, a SNIP stream enables the adaptor to cooperate with a dock in determining and authenticating the identities of agents that transmit information through the adaptor. A SNIP stream also enables the adaptor to establish additional streams. A tie-in may not be required to use SNIP for these functions; a dock and adaptor may have alternative means for performing the functions supported by SNIP. For example, a dock may use such alternative means when the dock and adaptor are implemented on the same hardware device.

SNIP allows the adaptor to establish additional streams called tethers for transmitting agent packets to and from the SNN. Each tether through the tie-in to a dock is assigned a unique number by the dock. The unique number is used in conjunction with the internal communication system address of the dock to form a unique tether address for each tether in the SNN. Each tether has exactly one tether address. A security advantage of an SNS is that tether addresses are not visible outside of the SNN, which hides such internal information from the adaptors and agents.

More than one agent may communicate over a single tether—for example, agents that are different applications running on the same machine. Depending on the connection policies, it may be possible for a single agent to have more than one tie-in to a SNN at the same time, at the same or at different docks. In such a case, the agent will have multiple tether addresses. For example, a single human agent may use multiple devices simultaneously. An adaptor may also communicate with more than one SNN, in which case it will use separate docks and tie-ins for each.

In the preferred embodiment of the invention, where the means of adaptor-SNN communication is an IP network and the tie-in is a secure communication session established through that network using the QUIC protocol, a bi-directional stream of the QUIC connection is allocated to each tether.

Compliant Flows

A compliant flow is a stream of communication, preferably bi-directional, between one adaptor to another through the SNN that carries communications from one agent to another. The compliant flow is compliant both in the sense that it complies with policies and in the sense that it accommodates changing conditions and changing policies. Visas are associated with packets communicated in either direction of a compliant flow. Compliant flows are secure channels. The identity of the source agent of each packet is authenticated over the entire compliant flow, from adaptor to adaptor, and policies are enforced from dock to dock.

Compliant flows are not always transmitted across the same sequence of tethers and links, but an SNS may take advantage of the fact that they often can be transmitted across the same tethers and links. Forwarders, for example, may first try transmitting a packet on the same link that was used to transmit the previous packet of the same flow. In some embodiments, the dock can find applicable visas for incoming agent packets more efficiently if the packets from the same compliant flow travel through the dock on the same tether and packets from different flows travel on different tethers. For this reason, an adaptor preferably creates and uses different tethers for different compliant flows through the adaptor. For example, adaptors may attempt to associate specific compliant flows from one agent with a specific tether to help improve the efficiency or performance of the dock. However, since the adaptor does not necessarily know the policies of the SNN, adaptors may still send packets from different compliant flows through the same tether. The separation of different compliant flows onto different tethers provides opportunities for efficiency, but the SNN does not require it, nor does it rely on an adaptor to always route packets from the same compliant flow through the same tether.

A SNN may also support other types of flows such as uni-directional multicast flows that are also policy compliant.

SNS Address Space

SNS may utilize a reserved portion of the IPv6 network address space called its SNS address space, and a portion of this address space may be reserved for dynamically allocated addresses. A NULL address may be reserved for agent packets that are not expected to be delivered. Another portion of the SNS address space may be reserved for internal-use addresses. Agent packets entering the SNN at tie-in with addressees reserved for internal use in the source agent address or destination agent address field are discarded and reported.

In the preferred embodiment, certain reserved addressees are allocated in the static portion of SNS address space. Addressees are also reserved in the dynamic portion of SNS address space for internal-use addresses, used by the visa service and admin service. These addresses are chosen unpredictably for each configuration from a large space of possible internal-use addresses.

In the preferred embodiment of the invention, to provide compatibility with existing IP-based software, each agent either has a IPv6 address in the SNS address space or is allocated a redirect address within the portion of SNS address space reserved for dynamically allocated addresses. The assignment of a redirect address ensures that reply packets to an agent with an IP address that is not in the SNS address space will be returned to the agent through the SNN via the replying agent's adaptor. It is the responsibility of the replying agent's adaptor to allocate a redirect address if it is required. The redirect address is only used between the agent and its adaptor, not within the SNN.

For example, external services accessible through the SNN, such as a web server, file server, DNS, or database server, may use a publicly registered address in the SNS address space to enable client agents to connect to them through the SNN. A client agent, recognizing that the IP address of such a server obtained via a DNS lookup resides within the SNS address space, sends agent packets destined for the server through an adaptor. The adaptor of the service agent may recognize that the source address of the client agent is not in the SNS address space, and translate it to a redirect address before transmitting the agent packet to the service, facilitating the direction of future return IP packets from the service agent back through the service agent's adaptor. The service agent's adaptor may then replace the contact address of the return packet with the client's original agent address before returning it through the SNN to the client.

Exemplary Adaptor

An exemplary type of adaptor is one that serves as an adaptor for agents using legacy software applications designed to communicate by a standard Internet Protocol, such as the IPv6 protocol.

Using such adaptors, legacy software applications can communicate through an SNN using IPv6 packets with destination addresses in the SNS address space. The applications configure their network interfaces to route packets addressed to the SNS address space to an adaptor. An adaptor receiving packets with source agent addresses not in the SNS address space allocates redirect addresses for those source agent addresses. It then uses network address translation methods in the art to translate the source agent addresses to the redirect addresses that were allocated for them, before sending them to the legacy application. This ensures that return packets will be directed back through the receiving adaptor, as described above. When it receives return packets addressed with destination agent addresses that are redirect addresses, the adaptor then translates these redirect addresses back into the agent address for which they were allocated.

As described in more detail below, the SNN uses SNIP to interact with adaptors to assist in determining and authenticating the identity of an agent that is communicating through the adaptor. In the case of a legacy software application that docks via the exemplary adaptor, the adaptor may use information available through the operating system to assist in determining and authenticating the identity of the agent. For example, the agent may be the combination of the software application and a current user, and the adaptor may also use information available through the operating system to assist in determining and authenticating the identity of the user and the identity of the software application image.

Configurations

A configuration consists of a policy specification and configuration-required resources associated with each hardware unit of the SNN. The configuration-required resources include any specific software or data that may be required by the hardware unit to facilitate the use of the configuration. Each configuration may also define a visa format, define a visa-service protocol, and provide service software.

A configuration does not include the state of the SNNs working memory such as packets in transit, the dock state of docks, or the forwarder state of forwarders. A key behavior of an SNS is that configurations can be changed while the network continues to operate. Internal packets will continue to be transported through the network under the policies of the configuration under which they entered the network.

At least two configurations may be stored in a SNN concurrently, each of which is associated with a unique configuration ID and a configuration status. In the preferred embodiment of the invention, only two configurations are stored in a SNN concurrently, and the two associated configuration IDs are the only two valid configuration IDs.

The configuration-required resources may include required parameters of the configuration that are available to all nodes. The required parameters include a maximum transmission unit (MTU), which is the MTU of the link with the smallest MTU in the configuration minus the size of the internal packet header. The required parameters also include a maximum allowed path length, which is the maximum number of links a packet is allowed to traverse as it travels from the ingress dock to the egress dock. Each configuration has admin service addresses and visa service addresses, which are preferably allocated unpredictably from the address space reserved for internal-use addresses.

The configuration status of a configuration typically progresses from UNDEFINED, to DEFINED, optionally to TESTING, and finally to ACTIVE. Only a single configuration, referred to as the active configuration, has an ACTIVE configuration status at any given time. When a new configuration's status becomes ACTIVE the previously active configuration's status becomes DEACTVATING and eventually reverts to DEFINED.

Configuration changes are communicated through SNAP. When an SNN is initialized, the status of one configuration is ACTIVE, and the status of all others is UNDEFINED. Any configurations that have UNDEFINED status can be edited by specifying incremental changes. For efficiency, SNAP also allows any UNDEFINED configuration to copy information from any DEFINED, TESTING or ACTIVE configuration, leaving its status UNDEFINED. This facilitates incremental updates to existing configurations.

Once a configuration has all the required associated information, SNAP allows the status of the configuration to be switched to DEFINED. SNAP also provides a means for switching the status of a DEFINED configuration to ACTIVE or TESTING and a means for switching a TESTING configuration to ACTIVE. Several configurations may be DEFINED, but only one is ACTIVE. When a new configuration becomes ACTIVE, the status of the previously active configuration is first switched to DEACTIVATING.

When the status of a configuration is switched to DEACTIVATING, deactivation takes place is two phases. The first phase is to wait until all packets that are associated with visas associated with the configuration ID of the deactivating configuration are delivered or discarded. The second phase is to cease to store all visas and de-allocate all resources allocated for those visas, including dock and forwarder state that was allocated for them, and to disestablish any links that are not being used by some other configuration with ACTIVE, TESTING or DEACTIVATING status. Once these two phases are complete, the configuration status is automatically changed to DEFINED.

It is possible to test a defined configuration, before making it the active configuration, by setting its status to TESTING. In test mode, for each packet processed at a node, the network verifies that the manner in which the packet would be processed under the configuration being tested matches the manner in which the packet is processed under the currently active configuration. If there is any difference in where or whether a packet arrives at its egress dock between the ACTIVE and TESTING configurations, that difference is logged. This allows a new configuration to be tested to determine which packets delivered or discarded in the currently ACTIVE configuration would be discarded or delivered in the TESTING configuration.

Before switching the status of a configuration to ACTIVE or TESTING the admin service will cause the allocation of any required resources, the loading of any configuration-required resources into the appropriate hardware units, and the creation of any communication sessions required to activate the configuration. If the configuration's status is later changed from DEACTIVATING to DEFINED, then these resources will be automatically de-allocated and any sessions associated with disestablished links will be disestablished, unless they are required by another configuration with ACTIVE, TESTING, or DEACTIVATING status.

Figure 3:
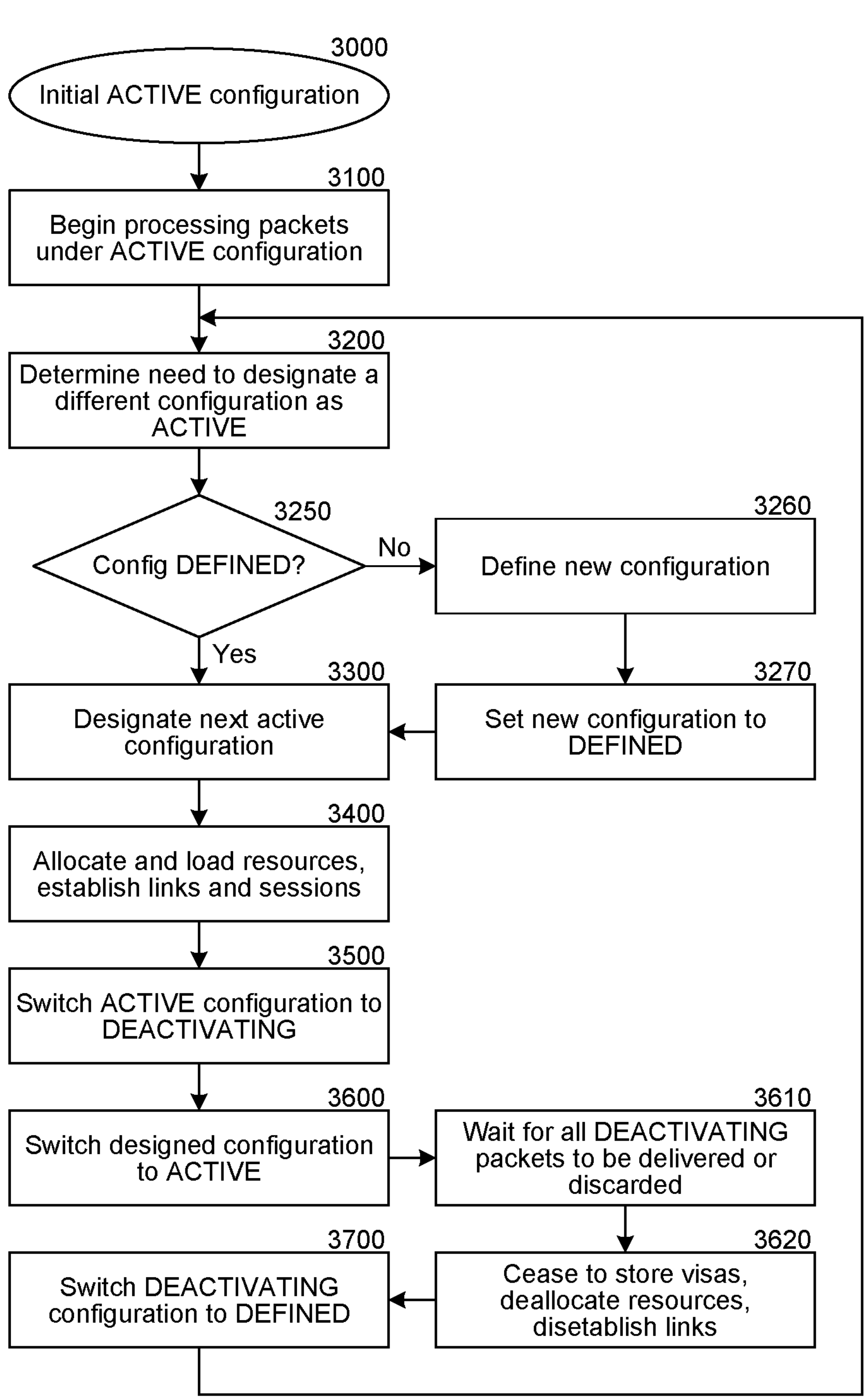
FIG. 3 shows a flow chart summarizing the creation, definition, activation, and deactivation of configurations, in accordance with an embodiment of the present disclosure.
Figure 4:
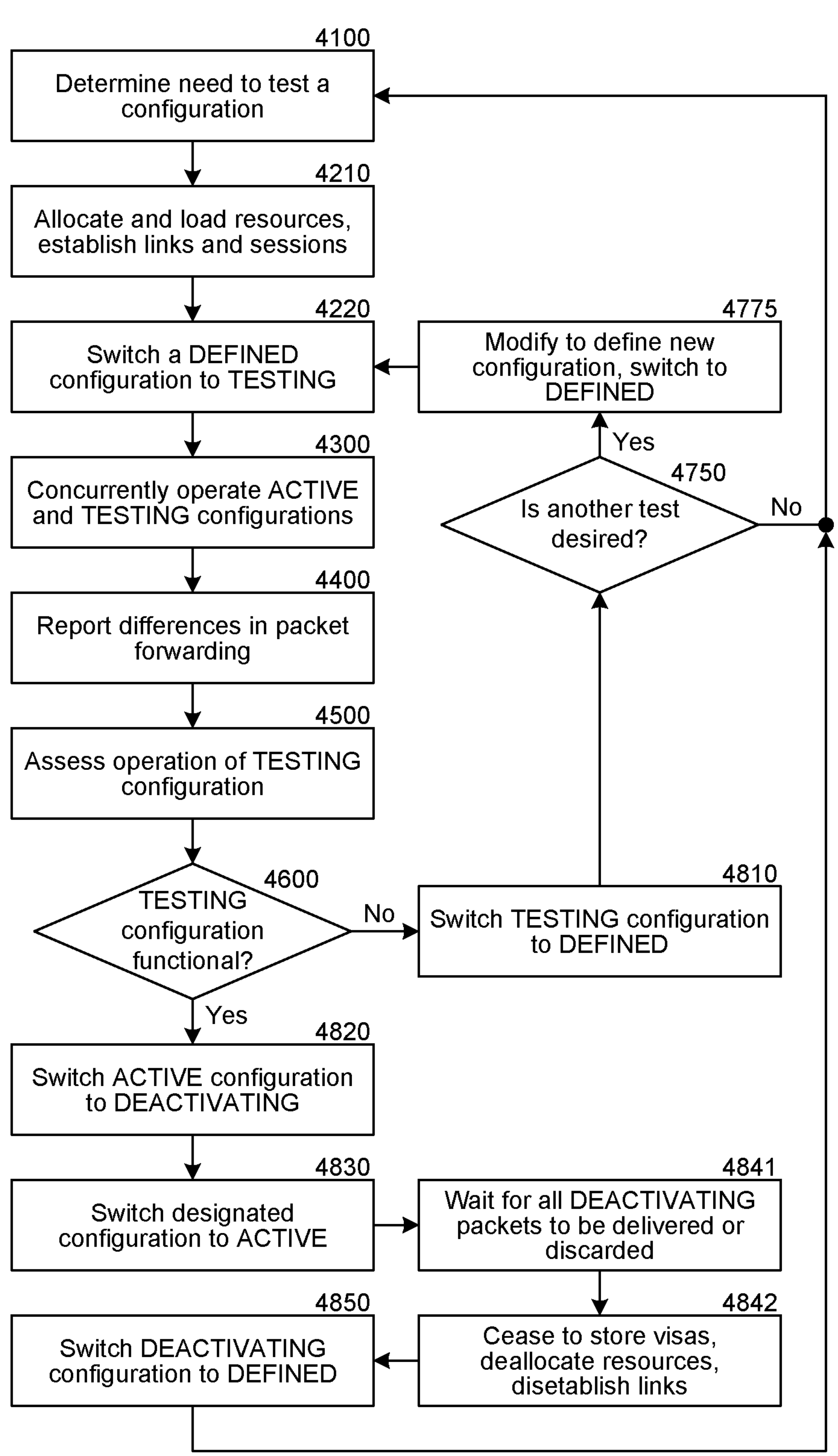
FIG. 4 shows a flow chart summarizing a testing process by which a configuration is tested via concurrent operation with a currently active network configuration, in accordance with an embodiment of the present disclosure.

The above techniques for managing configurations are illustrated in FIG. 3 and FIG. 4. FIG. 3 shows a flow chart summarizing the creation, definition, activation, and deactivation of configurations, according to a preferred embodiment of the invention. An admin uses the startup channel to establish an initial configuration with ACTIVE status 3000. The SNN begins operation by processing packets 3100 under this ACTIVE configuration.

When the admin determines 3200 the need to designate a different configuration as ACTIVE, the admin determines 3250 whether the desired configuration is already DEFINED. If the desired configuration is not already DEFINED, the admin defines 3260 a new configuration, then sets 3270 the newly defined configuration to DEFINED. If the desired configuration is already DEFINED, or after it has been defined and set to DEFINED, defined, and set to DEFINED, the admin designates 3300 the desired DEFINED configuration as the next active configuration.

In response, the SNN allocates and loads the resources and establishes the links and sessions 3400 required by the connection policies of the designated configuration. The nodes then switch 3500 the ACTIVE configuration to DEACTIVATING and switch 3600 the designated DEFINED configuration to ACTIVE. The nodes within the SNN then wait 3610 for all packets associated with a visa associated with the configuration ID of the DEACTIVATING configuration to be delivered or discarded. The nodes then cease to store all such visas, deallocate all resources allocated for such visas, and disestablish any links 3620 required for the DEACTIVATING configuration that are not being used by another ACTIVE, TESTING or DEACTIVATING configuration. Finally, the admin service automatically switches 3700 the DEACTIVATING configuration to DEFINED.

The network then continues to operate under the newly ACTIVE configuration. The above process can be repeated when an admin again determines 3200 the need to designate a different as ACTIVE.

FIG. 4 shows a flow chart summarizing a testing process by which a configuration is tested via concurrent operation with a currently active network configuration, according to a preferred embodiment of the invention. The testing process begins when an admin determines 4100 the need to test a configuration. The admin then requests that the SNN allocate and load the resources and establishes the links and sessions 4210 required by the connection policies of the designated configuration. The admin then switches 4220 a DEFINED configuration to TESTING. The DEFINED configuration may be a newly defined configuration or may be a previously defined configuration. The network then operates 4300 both the ACTIVE and TESTING configurations concurrently, with each node within the network reporting 4400 the differences in packet processing behavior between the two configurations. Based on these discrepancies, the admin (or the admin service on behalf of the admin) assesses 4500 the operation of the TESTING configuration.

If 4600 the TESTING configuration is judged to be functional, the nodes then switch 4820 the ACTIVE configuration to DEACTIVATING and switch 4830 the designated DEFINED configuration to ACTIVE. The nodes within the SNN then wait 4841 for all packets associated with a visa associated with the configuration ID of the DEACTIVATING configuration to be delivered or discarded. The nodes then cease to store all such visas, deallocate all resources allocated for such visas, and disestablish any links 4842 required for the DEACTIVATING configuration that are not being used by another ACTIVE, TESTING or DEACTIVATING configuration. Finally, the admin service automatically switches 4850 the DEACTIVATING configuration to DEFINED.

If 4600 the TESTING configuration is not judged functional, the admin switches 4810 the TESTING configuration to DEFINED. The admin then determines 4750 whether another test is desired. If not, the system continues to operate under the existing ACTIVE configuration until an admin again determines 4100 the need to test another configuration. If another test is desired, the admin defines a new configuration by modifying 4775 the definition of the recently tested configuration and switching the modified configuration to DEFINED. The admin can then perform additional testing of the network operating under the modified configuration by switching 4220 the modified configuration to TESTING.

Communication Policies

Communication policies describe which agents are allowed to communicate through the SNN, the circumstances under which they are allowed to communicate, and which resources they should be allocated for their communication. The circumstances may include where the agent is docked, what ports and packet formats are being used, the identity attributes and authentication status of the agent, the time, and information provided by a trust evaluation service. For example, a restrictive policy could allow an authenticated agent to send packets with a specific port number to another authenticated agent at limited bandwidth, only if it is connected to the network at a specific dock, during a specific time period.

Communication policies may also specify limits on when, how much, and at what rates those agents are allowed to communicate. Such limits may be specified in terms of the volume or rate of information that one agent is allowed to transmit to another agent within a specified time interval. Those limits may specify the volume of information as the number of bits transported by the payloads of the packets, the number of packets, or by some other measure. Time intervals may be specified to restrict communication to a particular schedule or restrict the volume of information communicated during the interval.

Communication policies may also specify how much bandwidth should be reserved through nodes to carry the packets associated with a visa and in what circumstances that bandwidth is reserved. Because nodes can only support a limited bandwidth of communication, a visa provides a way to reserve a specific amount of that bandwidth for communication under a visa. It is the responsibility of the visa service to not reserve more bandwidth than is available on each node.

Preferably, the volume of information communicated by the packet is measured in the number of bits of payload. Other volume measures may be used, such as the total number of bits in the packet, or the number of packets. Rate specifications may also specify the interval of time over which the rate is measured. For example, a policy could allow packets from agent A to agent B to transmit a volume of ten thousand bits of payload during each weekday, at a maximum rate of one packet per second over any ten-second interval. The exemplary policy might only allow agent A to send packets with a specific port number through a tie-in to a specific dock.

Although it is not the preferred operating mode for a SNN, a very broad policy could allow every agent to send any packets, claiming to be from any source, without any form of authentication, at any available bandwidth, at any time, from any location, to any other agent address. This broader policy would result in a SNN that functions in a manner similar to the public Internet.

Authentication Policies

Authentication policies specify how and when the SNN determines and authenticates the identity of docked agents. Agent authentication policies are enforced by the visa service. The agent authentication policies specify methods available for authentication of the attributes of an agent's identity, and the maximum interval of time for which an authentication can remain valid. Authentication may be accomplished by a variety of methods, preferably involving a challenge-and-response procedure requiring the agent to demonstrate that it has access to specific sets of required credentials to formulate a valid response. For example, a credential may be a password, a private cryptographic key, a hardware token, a specific piece of biometric information such as a fingerprint, or a certificate issued by a trusted entity. A successful response demonstrates to the challenger that the agent has access to the credentials. Using methods that are well known in the art, such as public key infrastructure, authentication can take place without the challenger obtaining a copy of the credentials. The authentication may take place directly between the challenger and the agent or its adaptor, or it may rely on a trusted authentication service that may be external to the SNS. It may be facilitated by a trust evaluation service that utilizes methods well known in the art, such as statistical signatures of communication and timing, external reports, or on interaction with a Trusted Platform Module (TPM) associated with the agent.

The agent authentication policies may specify that an authentication expires after a certain time. They may rely on a trust evaluation service to specify which methods of authentication are used, and when they expire. Agent authentication policies may also specify that the visa service should attempt to reauthenticate an agent when an existing authentication is about to expire. Authentication may also expire in certain specific circumstances, such as when the credentials that were used to authenticate cease to be honored. The cessation of honoring a specific credential can be specified through the SNAP protocol. Such a cessation is not treated as a change in policy.

Other authentication may take place in the operation of the SNS, such as the authentication of adaptors and nodes for the establishment of docks and links as specified by the connection policies. Such authentications may be governed by the authentication policies but are not considered to be a part of the agent authentication policies. Authentication policies also include any public keys used to verify signatures or encrypt or decrypt information, such as the public key or keys used by the visa service to endorse visas.

Connection Policies

Connection policies include a means of determining any internal and external communication system addresses of the nodes that are required for the operation of the SNN and a specification of the links that are to be established between them. Connection policies also specify a means for a node to establish secure channels for tie-ins, reliable secure channels for SNIP streams, reliable secure channels to services such as the visa service, and secure channels for links. These means include a means of determining any addresses, credentials, certificates, visas, and keys required for establishing the secure channels. They also specify which secure channels should be established before a configuration is activated or tested and which secure channels should be established dynamically and under what circumstances.

The connection policies may also specify limits on which adaptors are allowed to establish tie-ins at which docks of the SNN. In determining these restrictions, the connection policies may depend on the time and on the trust evaluation service to assign trust measures to nodes or adaptors. Connection policies also specify what portions of a node's memory are provisioned for use by each allocation pool.

Reporting Policies

Reporting policies specify what information is reported by a SNN to adjust the behavior of the SNS. Reports may be sent to the admin service, the visa service, or a hardware-related service, and these services may take actions in response to the reports. Reporting of information may include direct reporting or logging of information for future analysis. For example, attempts to send packets that are not in compliance with policy may be reported to a trust evaluation service as well as logged. Reporting policies ensure that reporting only takes place when the resources to do it are available. For example, reporting policies specify rules for the management of storage space available for logged information. Once storage space for logs becomes scarce, this scarcity condition is reported, and logging is adjusted to match the available resources. SNAP provides a means to read logs and to explicitly delete logged information. All reporting policies have limits to the resources they demand, in part to protect the network from attack by flooding.

External Policies

Not all policies associated with a SNS are enforced by the SNN. Policies not enforced by the network are called external policies. External policies are not part of the SNS, but their enforcement may be required for its successful application. A SNS may be facilitated by credential-issuing services, trust evaluation services and other services external to the SNN. In many cases, agents will be able to communicate with these external services through the SNS, in which case the SNS may be useful in maintaining the integrity of these external systems, but it cannot in itself ensure it.

Below are some examples of reliance on external policies. These policies and their method of enforcement may vary across different SNSs.

A SNS may rely on external policies for allocating addresses within the static portion of the SNS address space, either separately or in conjunction with names and/or credentials.

A SNS may rely on external policies for issuing, validating, distributing, revoking, and controlling access to credentials; and for informing the admins of relevant changes in their status.

A SNS may rely on external policies ensuring that appropriate software images are initially loaded into hardware units and ensuring that their integrity is maintained.

A SNS may rely on external policies ensuring that the admins control access to the startup channel.

A SNS may rely on a trust evaluation service. The methods used for evaluating trust may depend on the information gathered from network traffic and from other sources, for example, to compute a trust score for an agent. The specific methods of trust evaluation are thus a matter of external policy.

Admins may rely on policies that establish and maintain the integrity of their trusted admin tools.

Trusted admin tools may rely on information in external databases, such as personal and equipment databases or directories, to create a policy specification. For example, the policy description language may reference the information in these databases. External policies may thus be relied upon to protect the integrity of these databases.

Admins may rely on external policies to redefine valid policy specifications. External policies may also restrict how configurations are managed. For example, as described above, a SNN allows a new configuration to be tested before it becomes active to help ensure that the new configuration will not cause unintended disruption of services. External policies may specify when and how much such testing should take place before activating a new configuration. These policies may be enforced by the trusted admin tools.

Internal Communication System

The internal communication system is used to implement the links between nodes. The internal communication system is also used to implement reliable secure channels for communication between nodes and SNN services. As described above, the connection policies specify how and when links are established. Once established, a link persists until it either fails or policy requires that it expires. When a link fails, the failure is reported. A link to a node has at least one outgoing link stream, and each outgoing link stream has an associated incoming link stream. A node transmits internal packets on outgoing link streams and receives internal packets on incoming link streams.

In the preferred embodiment, the internal communication system includes both an internal network and shared memory, and links are reliable, secure channels. Links between nodes implemented on the same hardware unit are implemented using the shared memory of the internal communication system. Links between nodes on different hardware units are implemented as secure sessions through reliable, secure channels established over the internal network using transport protocols such as the QUIC protocol.

The connection policies also specify the topology of nodes and links. This topology preferably allows every node to communicate, either directly or indirectly, with any other. For example, the policies may specify that links are established directly between every pair of nodes. Alternatively, if the internal communication system only allows some pairs of nodes to communicate directly, for example because of network firewalls, the connection policies may specify links between only those nodes. In a large SNN, it may be advantageous for the connection policies to specify sparser links. In this case, the policies also define a method of routing packets through intermediate nodes to the destination node. For example, the connection policies may specify linking the nodes in the pattern of an n-dimensional cube. In this case, methods known in the art, including those described in U.S. Pat. Nos. 5,117,420, 5,151,996, and 5,530,809, allow packets to be forwarded to their intended destinations by traveling over multiple links.

Announcements

Announcement is a function supported by the SNN that allows information to be shared with many or all nodes within the SNN. Announcement may be implemented in the node software in a number of different ways, and different announcements may use different methods of announcement. In the preferred embodiment, announcements are implemented through the SNN using a visa that specifies a broadcast announcement or a targeted announcement. Alternatively, announcement may take place over inter-node announcement streams reserved for that purpose.

A broadcast announcement is a simple method of announcement in which the same information is communicated to every node. Broadcast announcement is the preferred method for announcing new information that will be stored at every node. In cases where it can be determined in advance that some nodes will not need certain information, targeted announcement may be accomplished by sending the information only to the nodes that may need it.

Announcement may also be accomplished by storing information in a distributed database that moves the information to a node when it is needed. For example, rendezvous announcement distributes announced information to specific locations in the network where all nodes know to find it. These rendezvous locations may be distributed across different nodes in the network so that the burden of storing the announced information and responding to queries for the information is spread across multiple nodes. This method is particularly advantageous for announcements of the association between a key and a value. In such a case, hash functions computed on the key may be used to determine the rendezvous storage locations for the value. Such announcements may be used, for example, to implement the visa service in a distributed manner across multiple nodes.

Dock State and Forwarder State

Each node has associated state information called its node state. Node state includes the state information that the nodes require to process packets, including the storage allocated to store visas and the associated information required to process them. This associated information includes the information required to track the rate and volume of information that is transmitted in association with those visas. Node state may also include state information required to maintain a reliable secure channel with the admin service or visa service. Finally, node state includes the link state associated with the connected links, and an internal packet processing buffer for storing internal packets awaiting processing. The node state of a dock is called its dock state, and the dock state of a forwarder called its forwarder state.

The dock state of a dock also includes an agent packet processing buffer for storing agent packets awaiting processing. The dock state also includes the tie-in state associated with each of its tie-ins, which includes the information required to maintain the tie-in and the tether state associated with each tether that passes through the tie-in. Finally, the dock state also includes any visa ingress data or visa egress data, including the visa key, associated with each visa the dock stores.

Policy Enforcement Procedures (PEPs)

Admins may describe policies using a wide range of policy description languages. The resulting policy specification is compiled into procedures called Policy Enforcement Procedures (PEPs) that are associated with a visa and executed by the nodes. Execution of a specific type PEP requires access only to specific types of information. The executing node is granted access only to this specific type information and restricted to specific kinds of actions when executing a type of PEP. These limitations and restrictions may be enforced either or both when the PEPs are compiled and at the time they are executed by the nodes.

Each PEP is associated with a unique PEP ID that may be used to specify the PEP within a visa. Preferably, PEPs and their associated IDs are distributed to hardware units as configuration-required resources. Other configuration-specific software used by the PEPs, such as the software that implements visa-service protocols may also be distributed as configuration-required resources. There are three types of PEPs: connection PEPs, reporting PEPs, and communication PEPs.

Connection PEPs, compiled from connection policies, are announced, so that they can be stored and executed by SNN nodes whenever tie-ins, links, and reliable secure channels to services are established, disestablished, or reestablished. Connection PEPs have access to the tie-in state of a dock's tie-ins, their state of trust as determined by the trust evaluation service, and to credentials and addresses that are required to establish tie-ins, links, and reliable secure channels to services. Connection PEPs can send and receive information over the internal communication system or means of adaptor-SNN communication, invoke reporting procedures, invoke an authentication procedure, communicate with the visa service, and establish docks and links. When a tie-in is established, the connection PEPs interact with the visa service to request permission to establish the tie-in and obtain any required authentications from the adaptor for establishing the tie-in. The connection PEPs execute the protocol required to establish the connection between the adaptor and dock.

Reporting PEPs are compiled from reporting policies and are announced, so that they can be stored and executed by the nodes whenever conditions arise that may require reporting. Reporting PEPs have access to the information passed to them about those circumstances. They also have read access to the state of the hardware unit in which they are executed. For instance, the PEP reporting the receipt of an invalid packet will be passed the bad packet when it is invoked. The hardware unit state includes an indication of the available local storage for logging information. The reporting procedure can use this information to construct and send messages to specific reporting-related services within the SNS, or to record new log entries within the hardware unit's local logs.

Two types of communication PEPs are compiled from communication policies; one type is used by docks and the other by forwarders. Either type of communication PEP may be optimized to take advantage of special packet processing hardware available on the hardware unit of the node. All communication PEPs have access to the public keys of the visa server.

Dock PEPs govern the conversion of incoming and outgoing packets at docks. For example, in the preferred embodiment of the invention, dock PEPs determine how docks will represent agent packets within transit packets when they enter the SNN and reconstruct them when they exit the SNN. There are different dock PEPs for ingress and egress docks. Dock PEPs have access to the agent packet, the internal packet; the dock state of the dock in which they are executing, the admin service, and the visa service.

Forwarder PEPs are invoked by forwarders to transmit or discard an internal packet as it is transported through the SNN. Forwarder PEPs have access to the packet's visa and the header of the packet. The forwarder PEP also has access to the forwarder's forwarder state, which includes all forwarder state conditions that are relevant for determining how to process the packet. For example, the forwarder state may include the forwarder's internal communication system address, the current time and physical location of the forwarder as determined by the forwarder's hardware unit, the state of its allocation pools, any forwarder state associated with links or link streams, and information obtained by the forwarder from the trust evaluation service. Typically, the associated parameters of the visa include the tether address of the destination, although in some cases, such as a broadcast visa, the destination tether address may be implied by the algorithm encoded into the forwarder PEP. Preferably, the rate limits that are used by the forwarder PEPs are slightly less limiting than the rate limits of ingress dock PEPs associated with the same visas, so that unless a part of the SNN becomes compromised, rates will be limited by the ingress dock even if there is some imprecision in the measurement of rate.

Visas

Figure 5:
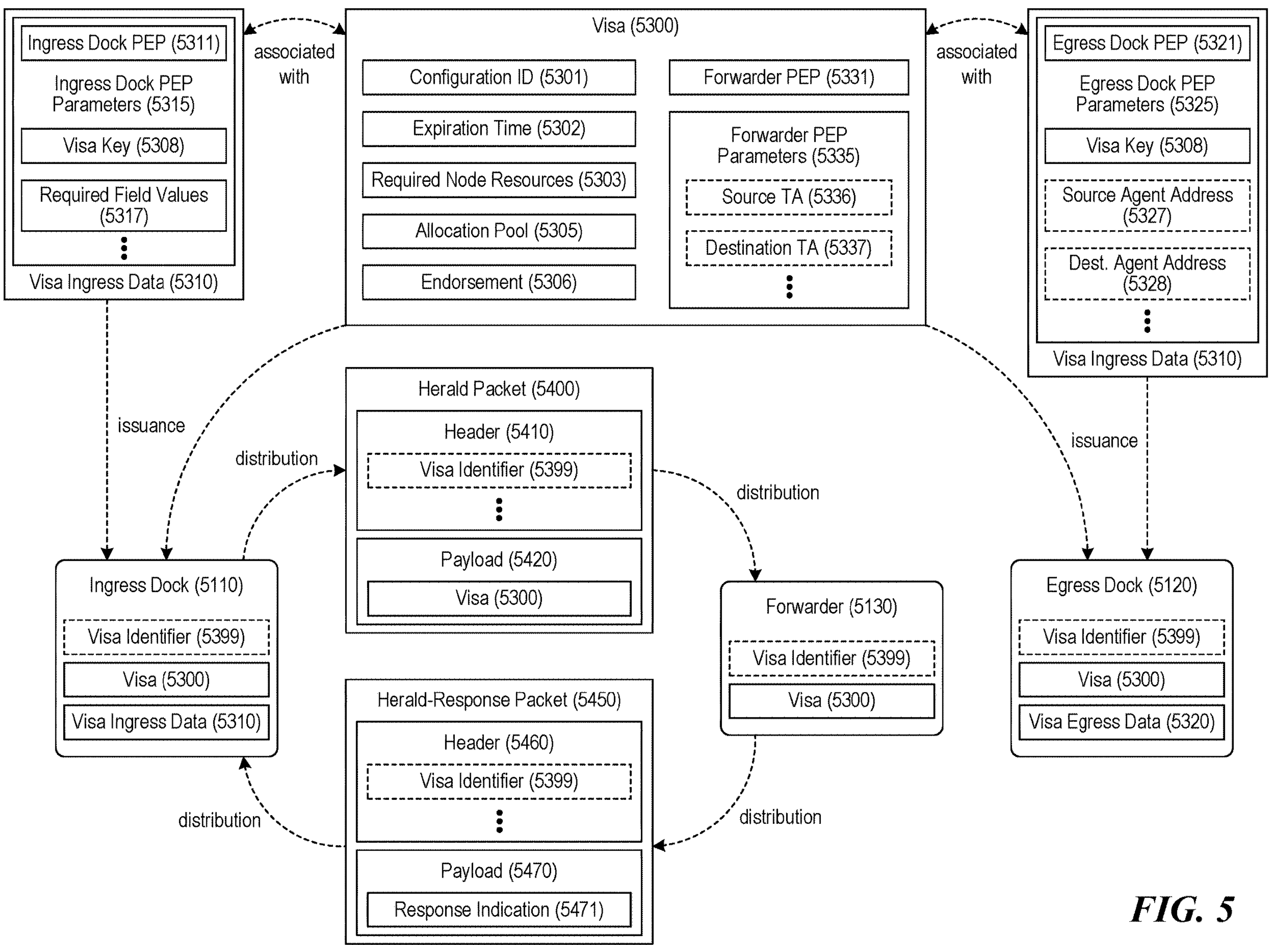
FIG. 5 shows the information within a visa, the information associated with a visa, and how the information is issued and distributed to nodes within an SNN, in accordance with an embodiment of the present disclosure.

FIG. 5 shows the information within a visa, the information associated with a visa, and how the information is issued and distributed to nodes within an SNN, according to a preferred embodiment of the invention. As described above, each internal packet is associated with a visa. The visa 5300, in turn, specifies a forwarder PEP 5331 and associated parameters 5335 that are referenced by the forwarder PEP, required node resources 5303 for processing packets associated with the visa, an allocation pool 5305 from which to allocate the required node resources, and an endorsement 5306 from the visa service. Furthermore, the visa is associated with an expiration time 5302 and a configuration, identified by its configuration ID 5301.

In effect, the visa is a certificate, cryptographically signed by the visa service, that attests that a node can utilize an internal packet associated with the visa, to transport an agent packet that matches the required field values, in the associated configuration, by applying the forwarder PEP with the associated parameters, before the expiration time. It also attests that a node has permission to allocate the required node resources from the allocation pool in the associated configuration when the visa is accepted.

The visa service generates the endorsement by generating one or more cryptographic signatures signing the rest of the information in the visa. The endorsement can be validated by using the public key or keys of the visa server. In some embodiments, the visa may also specify a visa identifier that is uniquely associated with the visa, and an internal packet may specify this visa identifier to establish an association with the visa. In some embodiments, the expiration time may be a special time value, called never, that specifies that the visa never expires.

The required node resources specify the storage and any other resources in the node required to store the visa and process internal packets associated with the visa. Once allocated, these resources enable storage of the visa's associations with incoming and outgoing links, a hop count, any required stream number to be used as a visa identifier, and the information required to measure the rate and volume of information transmitted in association with the visa.

In the preferred embodiment, the required node resources are specified by three numbers. The first number is the number of bits of storage that a node is required to allocate in association with each of the node's links for processing packets associated with the visa. The second number is the number of bytes of additional storage that a node is required to allocate for storing the visa and associated information and for processing the packets associated with the visa. The third number is the amount of processing bandwidth that is to be reserved by a node for use when processing packets associated with the visa. The processing bandwidth limit may be used as a means of limiting the rate of information transmitted over links under the permission of the visa. The allocation pool specifies the pool of storage from which that required storage should be allocated.

Each visa also has associated visa ingress data 5310 and visa egress data 5320. The visa ingress data specifies an ingress dock PEP 5311 and associated parameters 5315 for converting an agent packet to an internal packet, including a visa key 5308 and required field values 5317. The required field values are a set of field-and-value pairs, specifying what values may be in which fields of an agent packet for the visa to be applicable to the agent packet. The visa egress data specifies an egress dock PEP 5321 and associated parameters 5325 for converting an internal packet to an agent packet, including a visa key 5308, and any additional information required to reconstruct the agent packet from the information in the internal packet. In the preferred embodiment, this additional information includes the source agent address 5327 and destination agent address 5328.

Preferably, visas are uni-directional, so that a visa allowing transmission of a packet from a source tether address to a destination tether address is not the same as the visa that allows transmission of a packet from the destination tether address to the source tether address. Alternatively, visas may be bi-directional, in which case packets are also associated with a direction of flow. The direction of flow may be determined, for example, from a visa identifier that is different for each direction of flow, from the stream through which the internal packet was received, or from an additional field in the internal packet header that indicates the direction of flow. Different directions of flow are be specified in the visa ingress data and visa egress data associated with a bi-directional visa.

Issuing and Revoking Visas

Before a dock converts an agent packet to a transit packet associated with a visa, it may obtain an applicable visa from the visa service that allows transmission of transit packets to the destination tether address associated with the destination address of the agent packet. It may also obtain the visa ingress data associated with that visa, including an initial visa key.

To request a visa, the dock communicates with the visa service over its reliable secure channel to the visa service, using the active configuration's visa-service protocol. A request for a new visa includes the source the header information of the incoming agent packet for which the visa is requested and the tether address of the tether through which the agent packet entered the SNN. Upon receiving a request for a new visa, the visa service records the information that an agent using the agent address specified in the source agent address of the header can be contacted at the tether address. It then attempts to determine the destination tether address corresponding to the specified destination agent address. If no destination tether address can be determined, the visa service informs the dock accordingly and no visa is issued.

If the visa service successfully determines a destination tether address, it attempts to find a policy that would allow the agent connected at the source tether address to send packets to the agent connected at the destination tether address. The visa service then attempts to determine the identity of the source and destination agents as specified by the authentication policies of the active configuration. This may require determining the identity of the agents through their adaptors or from their agent addresses. After determining the identity of the addressed agents, the visa service attempt to identify communications policies of the active configuration that would allow those agents to communicate. This may require attempts to authenticate attributes of agent's identities as required by those policies. If the visa service can find no policies that would allow the addressed agents to communicate, the visa service does not issue a visa and the visa service informs the dock that the visa is refused. If the visa service finds an applicable policy, it issues the visa.

If there are multiple candidate sets of attributes that may satisfy the policies, the visa service attempts to verify the candidate sets sequentially. Preferably the visa service begins with the candidate sets that are more likely to succeed and depend on attributes that are already authenticated or can be authenticated without the interaction with a person. Once the visa service succeeds in authenticating a set of attributes that satisfies the policies, it need not consider other possibly valid combinations of attributes to issue the visa. If the visa service cannot authenticate an acceptable combination of identity attributes or for some other reason cannot issue a valid visa, it informs the dock accordingly, and no visa is generated.

To issue a visa, the visa service generates a visa endorsement by cryptographically signing the visa with its private key or keys. It also generates the associated visa ingress data and visa egress data. It then communicates the visa and visa ingress data by a reliable secure channel to the ingress dock and communicates visa egress data by a reliable secure channel to the egress dock, and the visa is issued. As shown in FIG. 5, upon receipt of the visa, the ingress dock 5110 stores the visa 5300 and the visa ingress data 5310 in association with a visa identifier 5399 associated with a visa. Similarly, the egress dock 5120 stores the visa 5300 and the visa egress data 5320 in association with the visa identifier 5399.

Preferably, upon issuing a uni-directional visa, the visa service also issues a second visa enabling communication from the destination tether address to the source tether address. If the visa service cannot issue this second visa, policies may require that it revoke the first visa. To revoke a visa before its expiration time, the visa server informs the ingress dock and the egress dock of the visa revocation.

The visa key can be used in a variety of methods to ensure the security of information transmitted between the ingress dock and egress dock. For example, the initial visa key may be used, until the visa expires, as the key that encrypts information at the ingress dock and decrypts information at the egress dock. Alternatively, the visa key may be updated by the server at regular intervals or established between the sending and receiving docks through a means of establishing a shared secret known in the art. For example, the visa key may be updated using additional internal packet types to implement a Diffie-Hellman key exchange. In an alternative embodiment, the initial visa key is a private key that has a corresponding public key which is included in the visa. This public key can then be used to check the validity of the packet each time it is received by a node with access to the public key.

The visa service maintains state information about the identity, tether address, and the authentication status of the identity attributes of each docked agent. It is possible to determine from authentication status of the identity attributes of a docked agent if, how and when it was authenticated. When an authentication attempt of an identity attribute is unsuccessful, the authentication status of the identity attribute may be updated to reflect the time and method of failure.

When possible, the visa service determines agent identities and authenticates agent identity attributes based on its state information. When such information is not available or has expired, the visa service authenticates the identity attributes of the source and destination agents by interacting with their adaptors or authentication services. To interact with an agent via an adaptor, the visa service preferably uses its reliable secure channel to the adaptor's dock to communicate using the visa-service protocol. Interactions with the dock through this protocol cause the dock to interact with the adaptor using the SNIP protocol. Thus, the dock can assist in the authentication-exchange between that visa service and the adaptor through which the agent is docked. Failed authentication attempts are reported as specified by the reporting policies.

When the authentication expires, as specified by the authentication policies, or when it is invalidated, the authentication status is updated to indicate that attribute is no longer authenticated. It will be invalidated, for example, if any of the credentials used to authenticate the identity of a tethered agent cease to be honored or if an authentication service retracts a certification. The authentication policies may also cause it to be invalidated for other reasons, such as a change in the state of the trust determined by a trust evaluation service.

The visa service keeps track of all docks to which it has issued a visa. The visa service may send these docks a new visa to replace a visa due to expire soon. If a visa becomes invalidated, for example, because an authentication that it has relied upon to issue the visa is invalidated, the visa service revokes the visa by informing all docks to which it has issued a visa of the revocation.

Packet Formats

As noted above, the SNN processes at least two types of packets—agent packets that enter the network at a dock, and internal packets that move between nodes across links.

An internal packet includes a header and a payload. The header includes a packet type and preferably includes a visa identifier. The header also includes any other header fields associated with the packet type. Each internal packet has a single associated configuration and visa. The visa identifier specifies the packet's visa. That visa is associated with a configuration and that configuration is associated with the packet through the visa.

A SNN supports at least three types of internal packets: transit packets, herald packets and herald-response packets. Each carries a different type of payload. A transit packet carries an additional field in its header called its encrypted packet checksum. A herald packet also carries an additional field in its header called its hop count.

Figure 6:
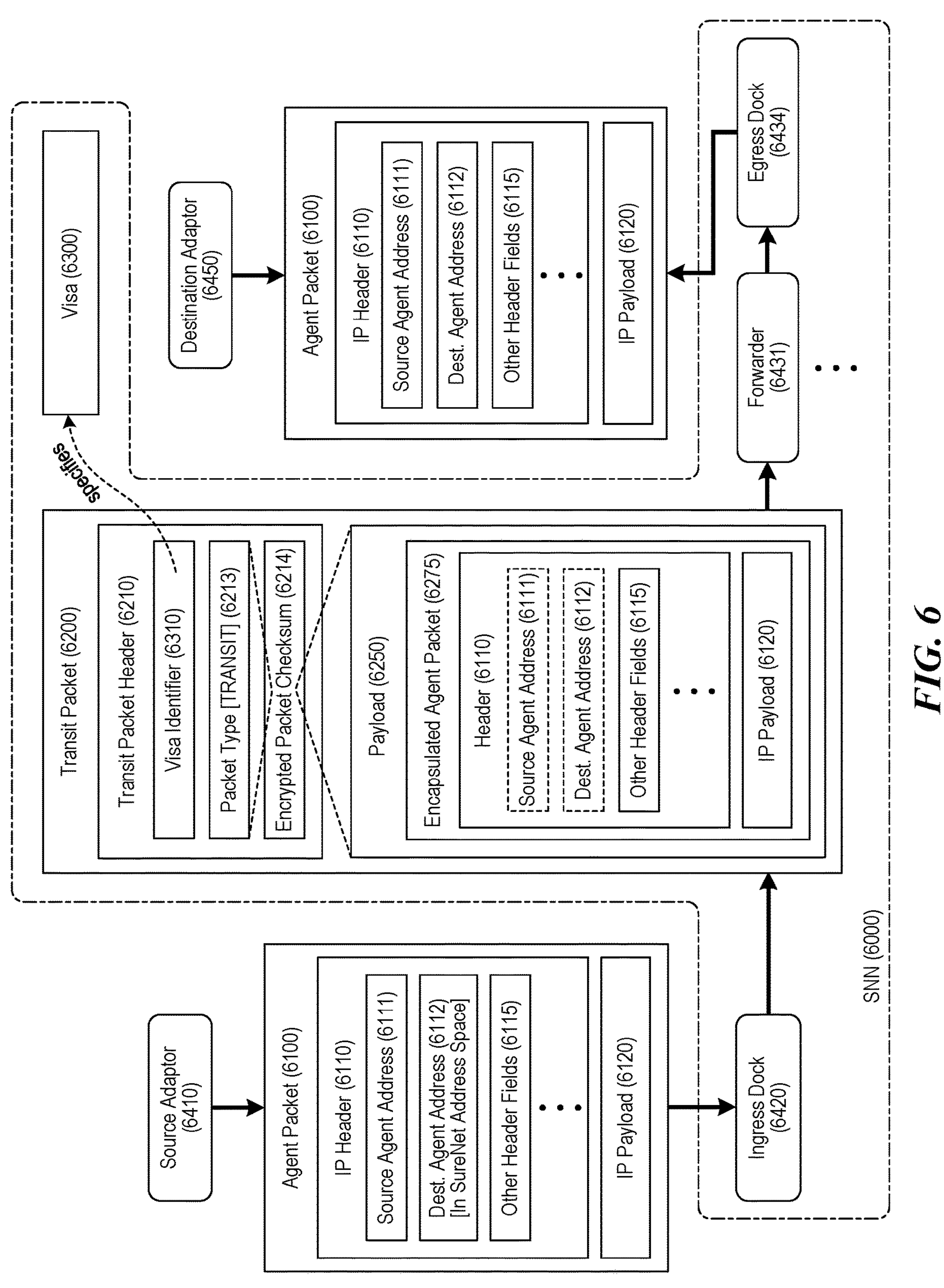
FIG. 6 shows an ingress dock converting an agent packet received from an adaptor into a transit packet for transmission through a SNN and subsequent conversion to an agent packet by an egress dock, in accordance with an embodiment of the present disclosure.
Figure 7:
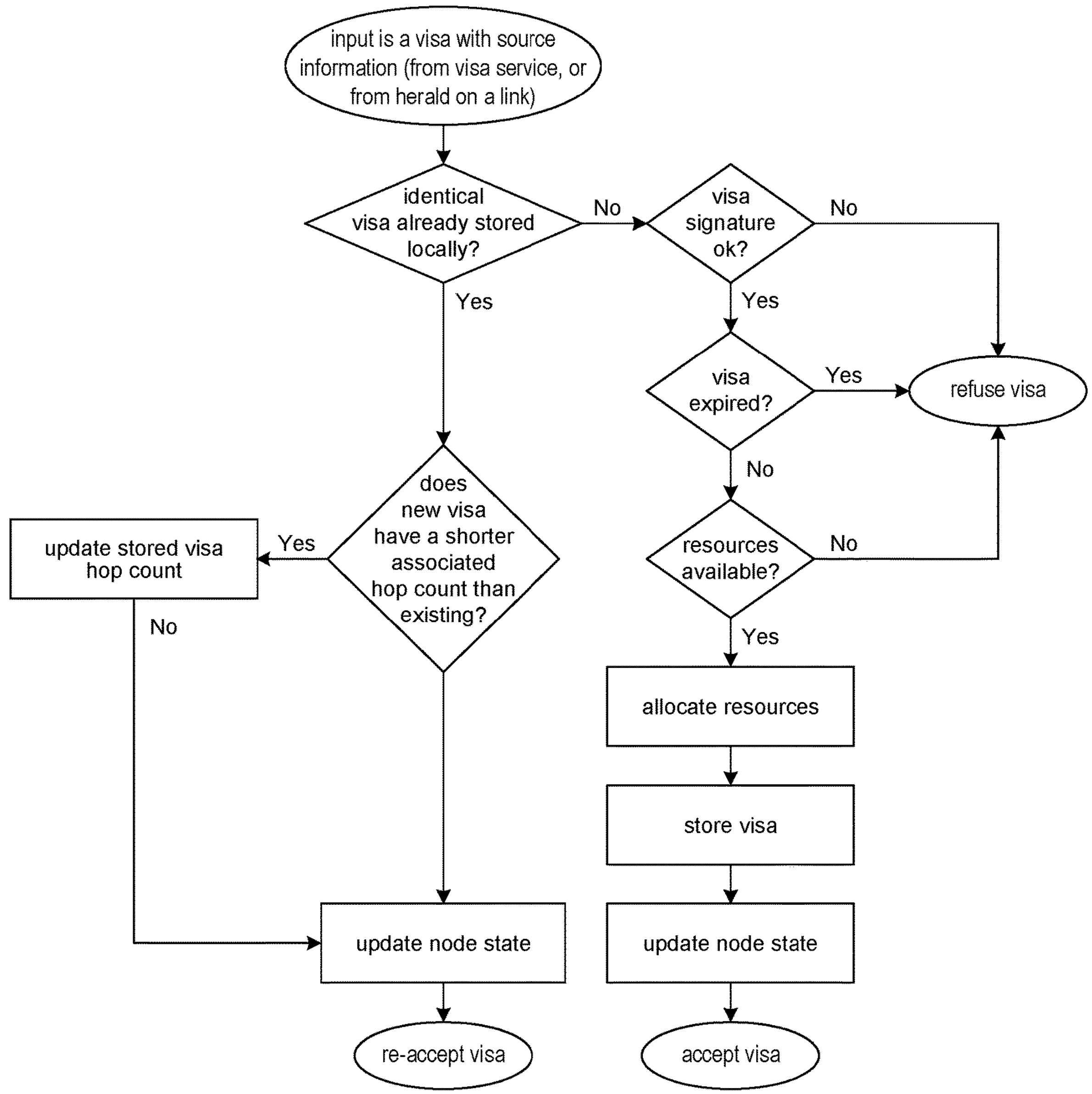
FIG. 7 shows a flow chart summarizing the behavior of a node upon receiving a visa, in accordance with an embodiment of the present disclosure.
Figure 8:
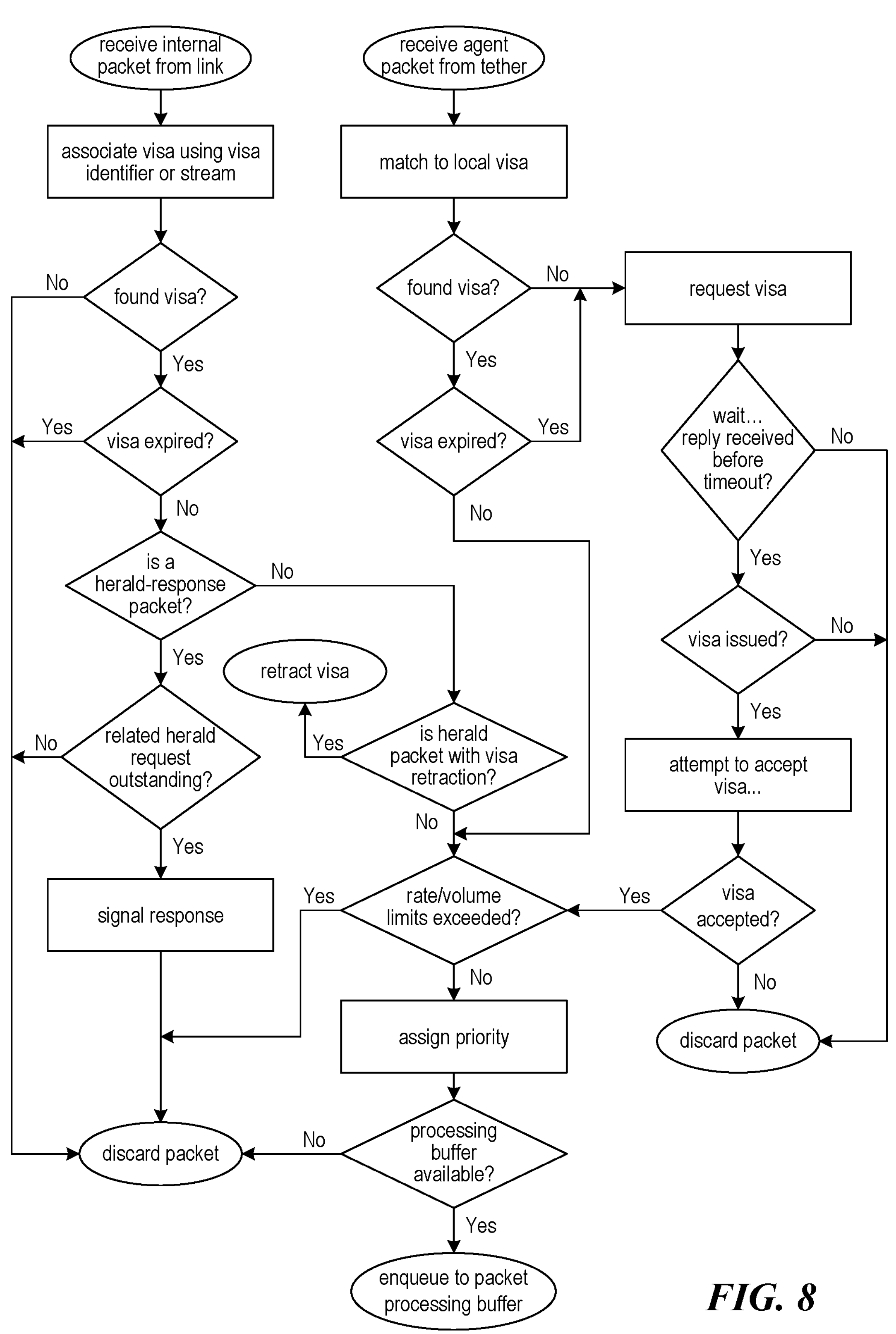
FIG. 8 shows a flow chart summarizing the behavior of a node upon receiving an agent packet through a tether or an internal packet through a link, in accordance with an embodiment of the present disclosure.
Figure 9:
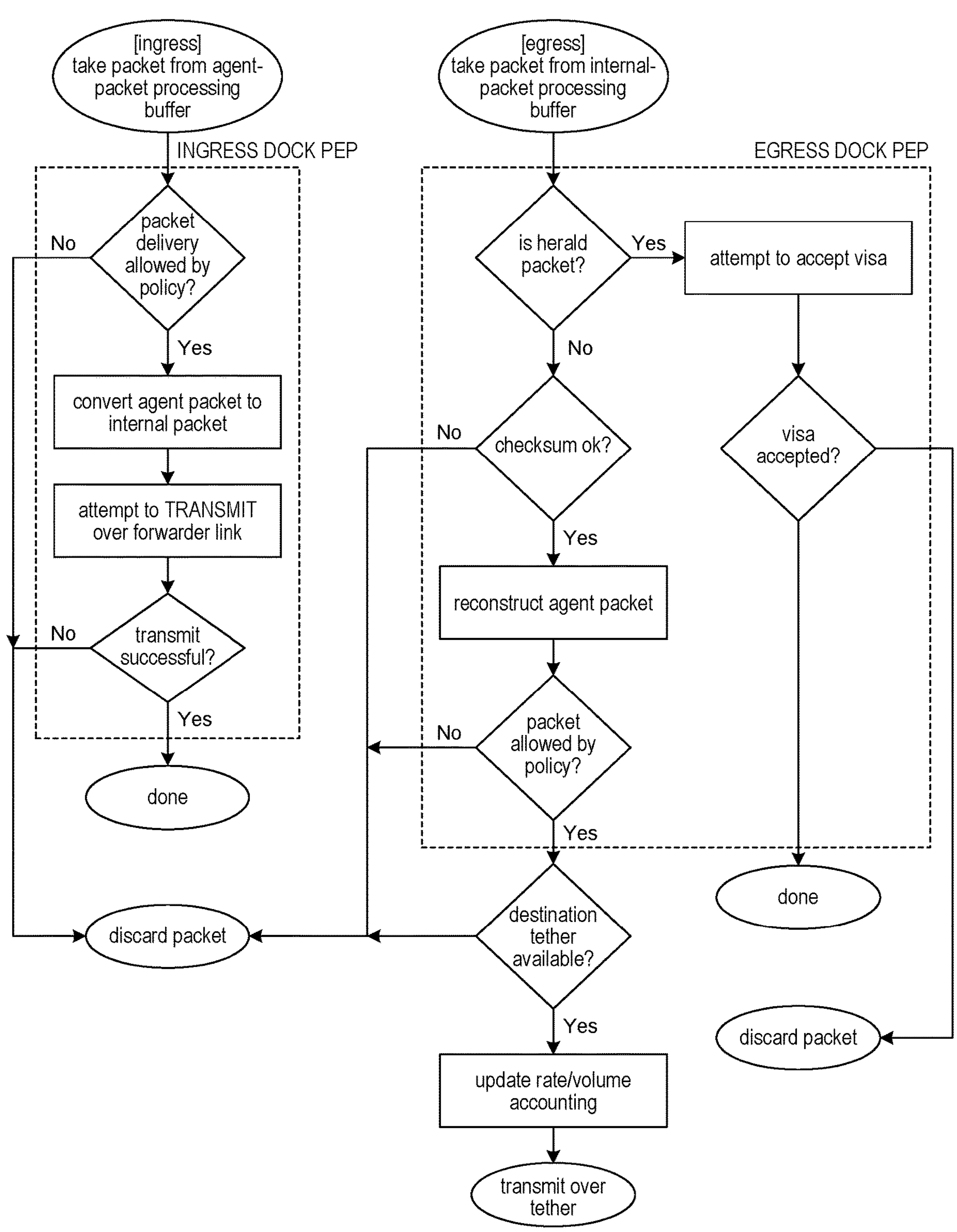
FIG. 9 shows a flow chart summarizing how a node attempts to transmit an internal packet over a link, in accordance with an embodiment of the present disclosure.
Figure 10:
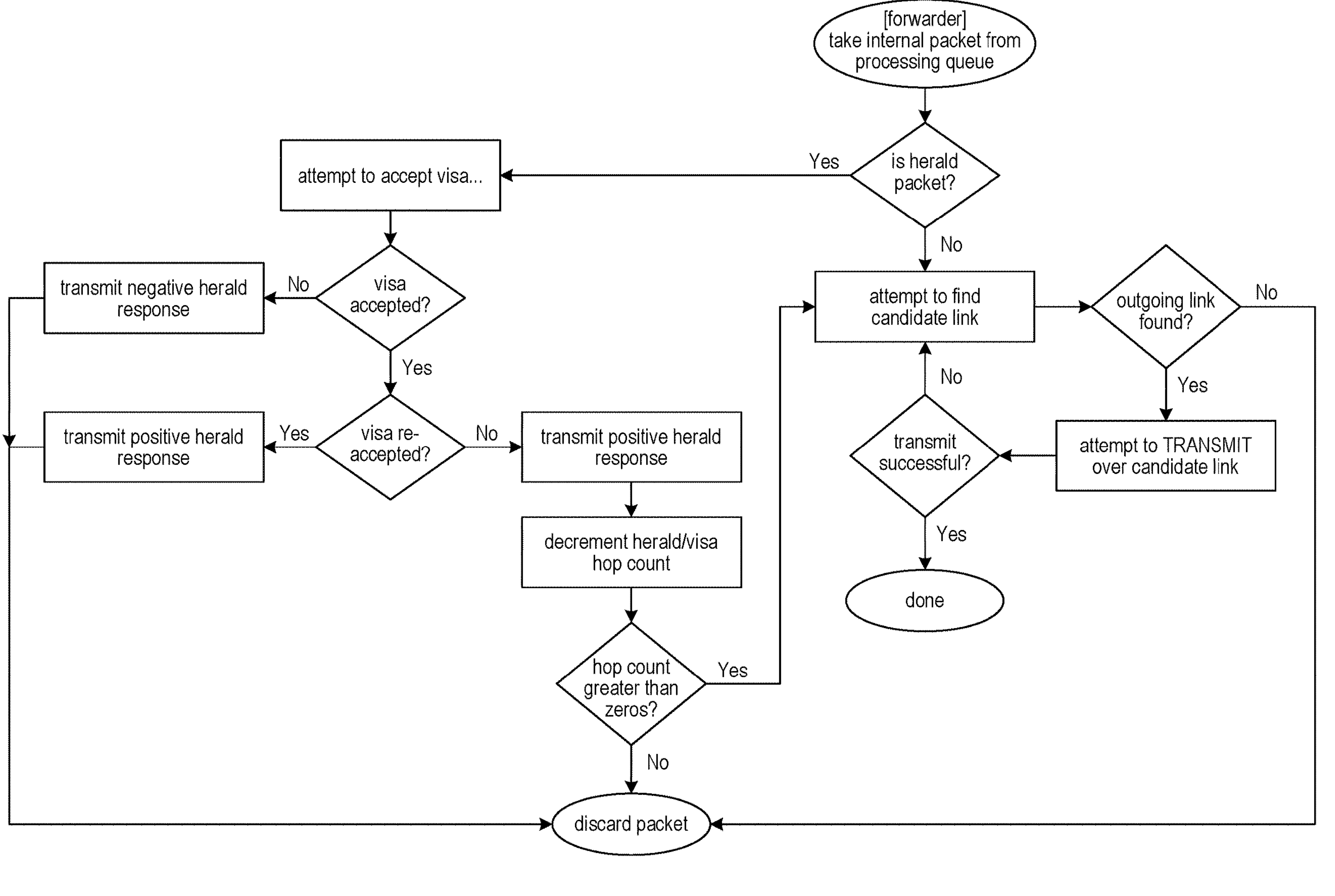
FIG. 10 shows a flow chart summarizing how a dock processes agent packets and internal packets, in accordance with an embodiment of the present disclosure.
Figure 11:
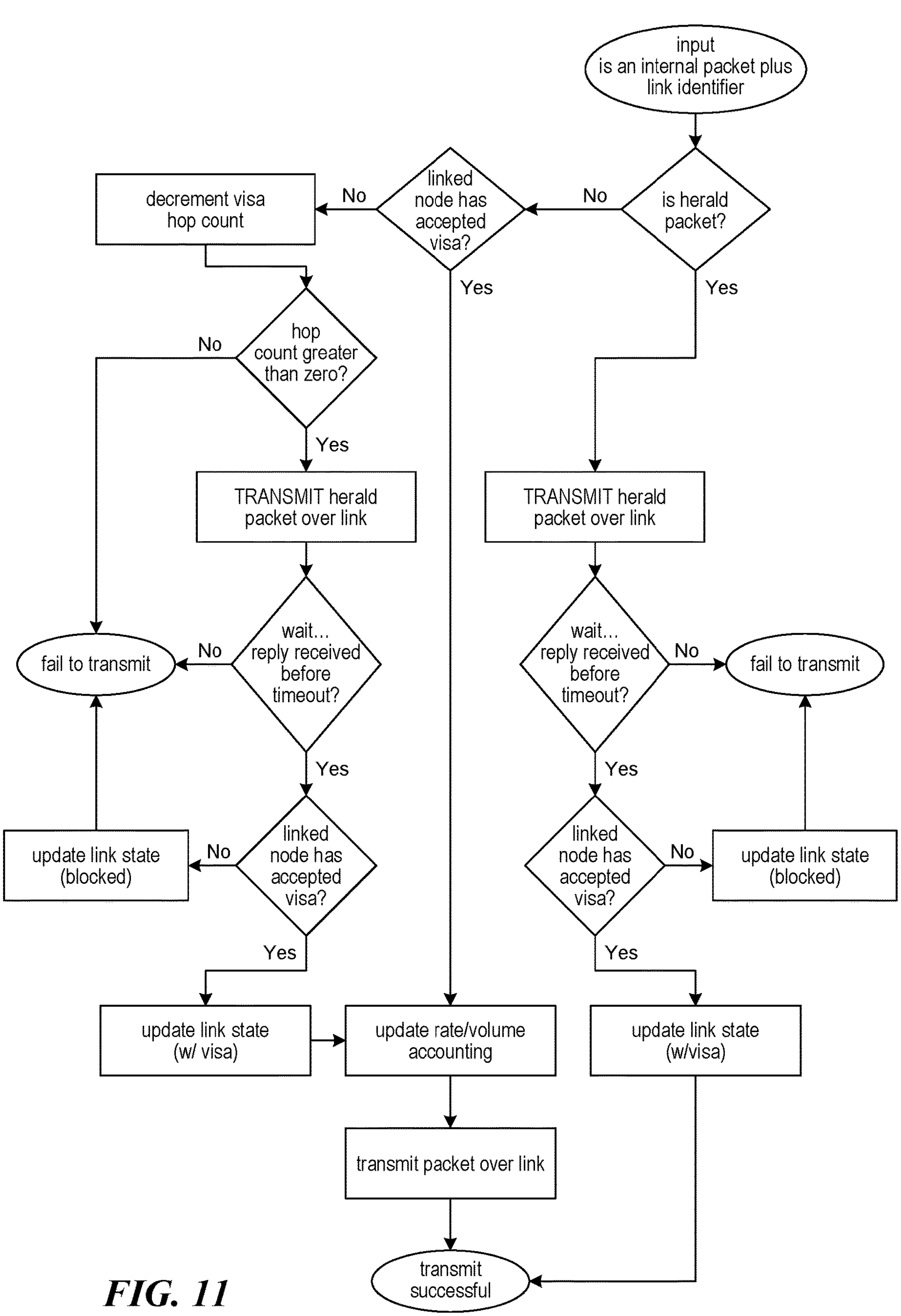
FIG. 11 shows a flow chart summarizing how a forwarder processes internal packets, in accordance with an embodiment of the present disclosure.

FIG. 6 shows an ingress dock converting an agent packet received from an adaptor into a transit packet for transmission through a SNN and subsequent conversion to an agent packet by an egress dock, according to a preferred embodiment of the invention. The ingress dock 6420 receives the agent packet upon entry into the SNN 6000 through a tie-in from a source adaptor 6410. In the preferred embodiment of the invention, the agent packet 6100 is an IP packet with an IP header 6110 and IP payload 6120. The IP header includes a source agent address 6111, includes a destination agent address 6112, and may include other header fields 6115. The adaptor receives the agent packet from the agent because the destination agent address was in the SNS address space. The ingress dock converts the agent packet to a transit packet 6200. As described above, the transit packet header 6210 includes a packet type 6213 and preferably includes a visa identifier 6310 that specifies the visa 6300 associated with the transit packet.

The transit packet carries an encapsulated agent packet 6275 in its payload 6250 which, in combination with the associated visa's visa egress data, is sufficient to reconstruct the agent packet. In some embodiments, the encapsulated agent packet carries the entire agent packet. In other embodiments, fields of the agent packet that have required field values in the packet's visa are not included in the encapsulated agent packet and are instead reconstructed from the visa egress data associated with the packet's visa when the packet reaches its egress dock. The payload also does not need to include fields, such as an IPv6 hop count field or IPv4 time-to-live (TTL) field, that can be replaced before leaving the SNN. In the preferred embodiment, the source 6111 and destination 6112 agent addresses of the agent packet are required field values, and they are not included in the encapsulated agent packet carried in the payload, since they can be reconstructed from the associated visa's visa egress data.

The ingress dock and egress dock use the means of encrypting information between them as a means for the egress dock to verify that a packet was transmitted by the ingress dock and was not altered during transmission. The means of encrypting information can also serve to conceal the payload of transit packets from forwarders that process the transit packet. The transit packet header also includes an encrypted packet checksum 6214. Preferably, the encrypted packet checksum is a checksum encrypted by the visa key associated with the packet's visa. As shown by the dashed lines of FIG. 6, the checksum is preferably computed on all fields of the packet except the visa identifier and the encrypted packet checksum. The checksum is not computed on the visa identifier because, in some embodiments, the visa identifier can potentially change each time it is forwarded.

The ingress dock transmits the transit packet through the link to its forwarder 6431. The transit packet may be transmitted through other links to other forwarders before arriving at the egress dock 6434. The egress dock converts the transit packet back to the agent packet 6100 using the encapsulated agent packet and the visa egress data. Finally, the egress dock transmits the agent packet to the destination adaptor 6450.

Returning to FIG. 5, the payload of a herald packet 5400 contains either information for a visa being distributed or a special value indicating that a visa has been revoked and is being retracted. In the former case, the part of the packet's visa carried by the packet contains all the information in the packet's visa that is required by forwarders to process packets associated with the visa. In the preferred embodiment shown in FIG. 5, the header 5410 of the herald packet contains the visa identifier 5399 and the payload 5420 of the herald packet contains the entire visa 5300. The hop count in the herald packet's header (not shown) indicates the maximum number of times the information in the payload should be forwarded.

Also as shown in the preferred embodiment of FIG. 5, a herald-response packet 5450 may carry a response indication 5471 in its payload 5470 that indicates whether the transmitting node, a forwarder 5130 in FIG. 5, accepts, re-accepts, or refuses the associated visa. The payload may also indicate the reason for a refusal. If the transmitting node accepts or re-accepts the visa, it stores the visa 5300 in association with the visa identifier 5399 associated with the visa.

Traditionally, the fields in a packet format are either fixed by the protocol or specified by other fixed-length fields which specify the length of the variable-length fields. Fixing field lengths at the time of protocol definition is inflexible and implementing variable-length fields requires extra run-time overhead. To address these deficiencies, internal packet formats may vary from configuration to configuration. Since internal packets never leave the SNN, each configuration can use a format that is advantageous for that configuration, provided that packets traveling though the SNN at the same time but using a different size or position for the visa identifier can be distinguished. In the preferred embodiment, the first byte of the internal packet header is used to specify the packet type and packet format, and the next bytes are used to specify the visa identifier. The number of bytes used to specify the visa identifier are defined by the configuration.

In some embodiments of the invention, configurations may use multiple types of transit packets for carrying multiple types of agent packets. Configurations may also define other packet types, such as packets for establishing shared secrets or packets for carrying an encrypted internal packet within their payload. The preferred embodiment of the invention, however, uses only the three required packet types.

Visa Identifiers

Every internal packet is associated with a visa, either explicitly by a visa identifier in the packet header or by association with the stream on which the packet entered.

In the preferred embodiment, the visa identifier is a stream number, indicating the incoming or outgoing link stream that the visa is associated with on any link with which the visa is associated. In this embodiment, a node may change the visa identifier within a packet header before transmitting it through a link.

In an alternate embodiment, the visa identifier in the packet header is a bit-string generated by the visa service and specified in the associated visa. In this alternate embodiment, the visa service assigns visa identifiers unpredictably from a space of possible visa identifiers that is much larger than the number of valid visas in the SNN at any given time, making it difficult to forge a visa identifier that will correspond to a valid visa. This may be accomplished by using a pseudo-random number generated by a cryptographically strong random number generator as all or part of a visa identifier.

In a second alternative embodiment, the visa identifier contains all of the information in the visa. An advantage of this method is that the information in the visa identifier does not need to be distributed to forwarders by other means.

In a third alternative embodiment, the visa identifier is not explicitly included in the internal packet header but is inferred from which stream the packet is communicated through. In this embodiment some means other than the visa identifier is utilized to differentiate the streams within a link. For example, docks may encapsulate internal packets within other packet types with stream numbers, or nodes may use different wavelengths of light for different streams on a fiber optic connection. As in the preferred embodiment, the visa identifier may be changed on the packet before transmitting it through a link, but in this case that does not require changing the packet header.

Distributing and Retracting Visas

Visas may be pre-issued and distributed as part of a configuration or issued at the request of a dock. After a visa has been issued by the visa service the SNN has a means to distribute the visa to the forwarders that will require it. It also has a means to retract a visa that has been distributed if it is revoked by the visa server. Distribution and retraction may be accomplished by a variety of methods, either in advance of use or on demand.

A node checks the endorsement on a visa before accepting the visa and checks the expiration time on a visa before using it to process a packet. If a node is not able to process a packet in compliance with the policies specified in the packet's visa, it discards the packet and report the discard as specified by the active configuration.

A dock processes an agent packet by associating it with a visa and applying the dock PEP and associated parameters specified by the ingress visa data associated with that visa. This either causes the agent packet to be discarded or converted into an internal packet associated with the visa and transmitted on the node's links. This may require requesting a new visa form the visa service, which is distributed before the packet is transmitted. A dock processes a transit packet as specified by the egress visa data associated with the packet's visa to convert it to an agent packet associated with that visa.

A forwarder processes an internal packet as specified by the visa associated with the packet. The forwarder PEP and associated parameters specify a means to either discard the packet or transmit it on a link. The forwarder may use this means to both transmit transit packets and distribute visas with herald packets.

Herald packets and herald-response packets may be used as means to distribute and retract visas. A visa may be distributed in the payload of a herald packet, or a sequence of several related herald packets. A visa may be retracted by a herald packet with a special value in the payload that indicates retraction of the packet's visa. In such embodiments, a node also has a means to ensure that a herald packet has always successfully distributed a visa on a link before it transmits a transit packet with that visa on that link. The node also has a means to accept and acknowledge visas distributed from herald packets it receives, and to transmit a herald packet in a visa along the path that a transit packet would travel from the node to the destination. A node has means to prevent the herald packet from being transmitted more than the maximum allowed path length of the configuration. A node also has a means to retract a visa that has been distributed from all the nodes which it caused the visa to be distributed to. A node also has a means of determining if the herald packet has been successfully distributed or retracted.

Dock and Forwarder Operation

One skilled in the art will appreciate that the above described functionality can be implemented in a number of different embodiments. The behavior of docks and forwarders in one such implementation is shown in FIG. 7 through FIG. 11 and described in detail below.

When a dock receives a visa from the visa service, it associates the visa with a hop count equal to the active configuration's maximum allowed path length. When a node receives a visa from a herald packet, it associates the visa with the hop count specified in the header of the herald packet. When any node receives a visa via a herald packet, it attempts to accept the received visa. If the visa is identical to a visa that was previously accepted, it takes and reaccept the visa, and if not, it determines if the visa is acceptable by checking the visa's endorsement and expiration time. If the visa is not acceptable it refuses the visa, if it is valid, the node checks if it has sufficient storage to allocate the required node resources specified in the visa from the allocation pool specified in the visa. If it is able to do so, it stores and accept the visa. If it is unable to do so, it refuses the visa.

To take and reaccept the visa the node first checks if the specified hop count is less than the hop count associated with the stored visa, and if so, it associates the stored visa with the lower hop count of the received visa. The node then associates the stored visa with any link or link stream on which the visa arrived and reaccept the visa.

To store and accept a visa, the node allocates the required node resources for the visa and stores the visa with the required associations, including the hop count associated with the visa, any ingress visa data that it received with the visa, and any link or link stream on which the visa arrived. It then may initialize any required node resources that require initialization before use. After all this has been completed, the visa is accepted. In an alternate embodiment, a node does not fully accept the visa until the visa has been successfully distributed to an egress dock.

A node ceases to store a visa when it expires, when its endorsement is discovered to be invalid, when it is retracted or when its associated configuration is deactivated. Whenever a node ceases to store a visa, it de-allocates any node resources that were allocated for that visa.

Herald packets that carry visas in their payloads can be used as a means to distribute the visa through sequences of nodes and links that are potential paths of a compliant flow through the network with which the visa is associated. Herald packets including a special value in the payload indicating that they are retractions may be used to retract a visa on all nodes to which the visa has been distributed.

Visa distribution may be initiated by an ingress dock that has accepted a visa issued by the visa service to distribute the visa to an initial sequence of nodes that can transmit it to its destination. Visa distribution may also be initiated by a forwarder to distribute the visa to a new sequence of nodes that can transmit it to its destination. By decrementing the herald packet's hop count each time it is forwarded, the length of these potential paths can be limited, for example, to the maximum allowed path length of the associated configuration. An advantage of this method is that transit packets do not require a hop count field that is changed each time the packet is forwarded.

Herald-response packets are transmitted in reply to herald packets. They are always sent back to the node that transmitted the herald packet to which they reply, on the same link on which that herald packet was received, and with the same visa identifier as the herald packet. Herald-response packets can indicate the acceptance or refusal of a visa or a visa retraction in their payload.

In the case where links are not reliable channels, methods familiar in the art may make use of unencrypted packet checksums, timeouts, retransmission, and additional packet types to ensure the reliable transport of herald packets and herald-response packets across a link.

Nodes receive and transmit internal packets on links and agent packets on tethers. When a node receives a packet, it attempts to associate the packet with a visa. If the packet is not discarded it processes the packet, and if the packet is still not discarded it attempts to transmit the packet. If a node discards the packet it reports the discard as required by the policies of the currently active configuration. The method used by nodes to perform these steps depends on whether the packet is an agent packet or an internal packet.

Only docks receive agent packets. A dock attempts to associate a received agent packet with a visa by finding an applicable visa that matches the agent packet. It determines if a visa matches an agent packet by checking if the field values in the header of the agent packet match the required field values of the visa. It first attempts to find a matching visa already stored in the node. If it finds a matching visa in the node, it checks if the visa is expired, in which case it is an applicable visa. If the dock does not find an applicable visa in the dock state, it requests a new visa from the visa service, specifying the source header information of the incoming agent packet and the tether address of the tether on which the agent packet was received in the request. It then waits for a response from the visa service. If no response is received or if the visa service refuses to issue a new visa it discards the agent packet. If the visa service does issue a visa the dock attempts to accept the visa, and if it succeeds in accepting the visa it is an applicable visa. If the dock does not succeed in accepting the visa, it discards the agent packet. If the dock is able to find an applicable visa for the received agent packet it associates the agent packet with that visa, and attempt to add the packet to its agent packet processing buffer.

A node attempts to associate an internal packet with a visa either by finding the unexpired visa associated with the visa identifier or with the incoming link stream on which the packet arrived; if no such visa is stored in the node, the packet is discarded. If a node has successfully associated an internal packet with a visa, it attempts to process the packet. If the packet is a herald-response packet, and the node is waiting for a response on the link stream on which the packet arrived, it uses the indication of acceptance in the visa as the response. Whether or not it was waiting for such a response, it then discards the herald-response packet. If it is a herald packet and the payload of the herald packet is the special value used to indicate retraction of the visa, it retracts the visa. Otherwise it attempts to add the packet to its internal packet processing buffer.

When a node attempts to add a packet to a packet processing buffer, it first checks if processing the packet would exceed any volume or rate limits specified in the visa. If the packet could not be processed without exceeding these limits, the packet is discarded. A node then determines if the packet should be prioritized. If the measured bandwidth of processing packets associated with the packet's visa is less than the reserved bandwidth specified in the visa, the packet is prioritized, otherwise it is not prioritized.

Each packet processing buffer has two first-in-first-out queues for packets. The first queue is used for packets that are prioritized. The second queue is for packets that are not prioritized and prioritized packets when the first queue is full. When adding packets to the processing buffer the node checks for an available queue. If the packet is prioritized the node first checks for space in the first queue; if the first queue does not have space available, it checks for space in the second queue. If the packet is not prioritized the node only checks for space in the second queue. If the node cannot find space in a queue for the packet, it is discarded. Otherwise it is added to the queue where the available space was found.

A node processes packets that have been added to a packet processing buffer by applying a communication PEP associated with the packet's visa. The node first attempts to process a packet from the first queue, and if the first queue is empty it processes a packet from the second queue, if one is available. If one is not available, it waits for a packet to be added to the packet processing buffer. A node processes a packet from the processing buffer by applying a communication PEP to the packet, which either discards the packet or transmits the packet on a link.

If processing a packet causes a node to attempt to transmit an internal packet on a link, the node first checks if the packet's visa has been accepted on the link, if not it first attempts to distribute the visa on the link. If this attempt is successful or the visa had already been accepted on the link, the communication PEP updates any applicable volume and rate measures associated with the packet's visa and then transmit the packet on the link.

To attempt to distribute a visa on a link, the communication PEP generates a decremented hop count from the hop count associated with the visa. If that decremented hop count is zero, the attempt to distribute the visa on the link is unsuccessful. If the decremented hop count is not zero, it may allocate a stream or a stream number on the link that is associated with the visa, and it transmits a herald packet with the visa and the decremented hop count. It then waits for a response. If it fails to receive a response within the required time, or if it receives a response indicating the linked node refuses the attempt to distribute a visa on the link, then the attempt to distribute the visa on the link is unsuccessful. If it receives a response indicating the acceptance of the visa, the node records that the visa has been accepted on that link, and the attempt to distribute the visa on the link is successful.

It will be apparent to one familiar with the art that when waiting for a response or waiting for a packet to arrive in a processing buffer the node may perform other tasks, and that when waiting for a response a node may recognize that no response is received if the response has not been received within a specified time.

A dock processes an agent packet from the agent packet processing buffer by applying the dock PEP and parameters in the ingress visa data associated with the agent packet's visa to the packet. This ingress dock PEP converts the agent packet into an internal packet with the visa identifier of the associated visa, payload information sufficient for the egress dock to reconstruct the encapsulated agent packet, and an encrypted packet checksum encrypted with the visa key in the ingress visa data. The payload may also be encrypted with the visa key in the ingress visa data. The ingress dock PEP checks if the transmission of the converted packet is allowed by policy, if it is not it discards the packet, otherwise it attempts to transmit the internal packet on the dock's link. If the attempt to transmit the packet is not successful, it discards the packet.

A dock processes a transit packet from the internal packet processing buffer by first checking the type of the packet. If the packet is a herald packet it attempts to accept the visa, and then discard the packet. If the packet is a transit packet, it applies the dock PEP and parameters in the egress visa data associated with the internal packet's associated visa to the packet. The egress dock PEP first verifies the encrypted packet checksum using the visa key in the egress visa data. If this verification is unsuccessful it discards the packet, otherwise it reconstructs the encapsulated agent packet from the internal packet and the egress visa data. It then checks if the delivery of the packet is allowed by policy and if the tether on which the packet is to be delivered is available for transmission. If both of these conditions are true, the egress dock PEP then transmits the internal packet over a tether for delivery to an adaptor, otherwise it discards the packet.

A dock processes a herald packet from the internal packet processing buffer by attempting to accept the visas or visa retraction and sending a herald-response packet indicating acceptance of the visa or visa retraction back on the link on which the herald packet was received.

A forwarder processes internal packets associated with visas from the processing buffer by applying the forwarder PEP and associated parameters specified in the packet's visa to the packet.

When applied, a forwarder PEP executes by first checking if the packet is a herald packet. If it is a herald packet it attempts to accept the visa in the payload of the herald packet. If the forwarder attempts to accept the visa and that attempt results in refusal of the visa, the forwarder PEP transmits a herald-response packet indicating refusal of the visa back on the link from which the herald packet was received and discards the herald packet. If the attempt results in the acceptance or re-acceptance of the visa, the forwarder PEP transmits a herald-response packet indicating acceptance or re-acceptance back on the link from which the herald packet was received. If the attempt results in the acceptance of the visa that was not a re-acceptance, the forwarder PEP decrements the hop count, and if the decremented hop count is not zero it continues to process the packet, otherwise it discards the herald packet.

Next, the executing forwarder PEP attempts to find a link that is not blocked to the packet. A link is blocked if it has no outgoing storage buffer available to accept the packet. The link to a node on which the packet arrived is always blocked to the packet. A link may also be blocked to packets traveling under the packet's visa if that visa was refused on the link. The forwarder PEP first attempts to use the link that it most recently used to transmit a packet associated with the same visa. If this link is blocked to the packet, the forwarder PEP attempts to find and use another link not blocked to the packet that moves the packet nearer to its destination. If that is not possible, it attempts to find some other link that is not blocked to the packet. If it does find a link it can use to transmit the packet, it attempts to transmit the packet on that link. If that attempt to transmit is unsuccessful it attempts to find another link. If the forwarder PEP fails to find a link that is not blocked to the packet, it discards the packet.

To retract a visa, replies with a herald-response packet indicating the acceptance of the retraction, transmits the herald retraction packet on every link that accepted the visa, the node ceases to store the visa, and changes the link state on each of those links to indicate that the visa is not accepted on those links.

SNN Services

The SNN may have a means to allow some number of hardware units implementing the visa service or admin service to fail without disabling the visa service or admin service. For example, the visa service and admin service may be implemented using k-of-n redundancy methods familiar in the art. The SNN may also have a means of ensuring that service components implemented on some number of hardware units endorse any responses by the visa service or the admin service.

In the preferred embodiment of the invention, redundancy is provided by implementing the visa service and the admin service on multiple sub-servers implemented on multiple hardware units. Both of these services generate cryptographically endorsed responses to requests requiring the endorsement of multiple sub-servers. In this embodiment, the visa ingress data and visa egress data also have endorsements, generated by the same method as the endorsement of the visa, that are validated by the ingress and egress docks before accepting the visa.

The visa service receives visa requests from docks and responds with issued visas or refusals. The admin service receives requests from an admin and responds with acknowledgements and other information to the admin and sends other responses to the admin's request to the nodes and hardware units. Either service may receive reports, which are interpreted as requests to acknowledge the report, and the services may respond to the reports with acknowledgements. All of these responses require endorsement.

In the preferred embodiment, the visa service is be implemented on multiple hardware units. Each of these hardware units has a similar instance of software called a sub-server that can communicate through a secure channel to docks to issue a visa. Each of these sub-servers is a component of the visa service. All sub-servers store all communication policies. The sub-servers use secure channels, established between them through the SNN, to share the authentication status of agents' attributes using methods well known in the art. Each of these sub-servers also has a secure channel to other sub-servers.

To issue a visa in response to a visa request, the responding sub-server first generates the information in the visa and the information associated with the visa that requires endorsement. It sends that information, and any other information in the visa request, to other sub-servers over the secure channels. When each sub-server receives the information, it attempts to determine if such a visa and associated information is compliant with policy. If so, it cryptographically signs the information that requires endorsement, using its private key, and returns the resulting signature to the responding sub-server. The responding sub-server then uses its own signature in combination with the policy-required number of additional sub-server signatures to endorse the visa and associated information, which it then issues.

To issue a refusal in response to a visa request, the responding sub-server first sends the information to be included with the refusal, which may include information from the visa request, to the other sub-servers over the secure channels. When each sub-server receives this information, it attempts to determine if such a request should be rejected with the information included in the refusal. If so, it cryptographically signs the information, using its private key, and returns the resulting signature to the responding sub-server. The responding sub-server then uses its own signature in combination with the policy-required number of additional sub-server signatures to endorse the information in the refusal, then issues the refusal by sending the endorsed refusal to the requesting dock.

In the preferred embodiment, each dock's reliable, secure connection to the visa service includes multiple reliable, secure connections to sub-servers of the visa service. In this case, the dock sends its visa requests to one of the sub-servers of the service, and if it fails to receive a valid response, with a valid endorsement, within a certain period of time after the request, it may re-attempt the request by sending it to a different sub-server.

In the preferred embodiment, the admin service is also be implemented on multiple hardware units in a manner similar to the visa service. The sub-servers of the admin server also use the secure channels established between them to share state. In the case of the admin server, the requests are made by and the responses are sent to an admin rather than a dock, and the admin's reliable, secure channel to the admin service may include multiple reliable, secure connections to sub-servers of the admin service. The admin server may also send additional endorsed responses, based on the requests of the admin, to the hardware units and nodes. The validity and endorsement of these responses is verified before they are accepted.

Either SNN service may also receive reports from nodes or hardware-related services in the form of requests for acknowledgment of the reports. In the preferred embodiment, the nodes' and hardware-related services' secure channels to the service include multiple reliable, secure connections to sub-servers of the service. The responses acknowledging reports are endorsed by multiple sub-servers, in the manner described above. The endorsement of these report responses is checked for validity by the reporting node or hardware-related service. If the reporter does not receive a valid response to a report, the reporter may attempt to re-transmit the report to another sub-server.

SNS Devices

The are several types of devices that may be advantageously used to create an embodiment of an SNS. Such devices are referred to as SNS devices. SNS devices network interfaces, including wired electrical or optical interfaces and wireless interfaces and interaction interfaces, including keypads, card readers, microphones, audio speakers, speech understanding systems, cameras, displays, and face, fingerprint, voice and other recognition systems. These devices may or may not incorporate processors with firmware, software, or other programmable elements. These devices may have firmware, addresses, and other network information required to establish secure channels through the interfaces stored in read-only memory. Alternatively, they may store this information in programmable read-only memory in which case the device may have a means of programming that read-only memory that preferably requires physical access to the device and an access tool such as a physical key. A device implementing components of the SNN may also implement hardware-related services of the SNN.

One such SNS device is a hardware unit, called a dock device, that implements the functionality of a dock and enables ties-in to that dock through adaptor-facing interfaces that facilitate the use of wired or wireless connections as its means for communicating with adaptors. A dock device also has SNN-facing interfaces that facilitate the use of wired or wireless connections as its means for communicating with the internal communication system of an SNN. For example, each of these interfaces may be an Ethernet or Wi-Fi interface. A single interface may serve as both an adaptor-facing interface and an SNN-facing interface.

An optional addition to a dock device is the functionally of a forwarder linked to the dock by a link internal to the device. The forwarder may also have SNN-facing interfaces that facilitate a means for communicating with the internal communication system of an SNN.

Another SNS device is a hardware unit, called a forwarder device, that implements the functionality of a forwarder, with SNN-facing interfaces that facilitate the use of wired or wireless connections as its means for communicating with the internal communication system of an SNN. For example, each of these interfaces may be an Ethernet or Wi-Fi interface.

Another optional addition to either a forwarder device or a dock device that includes the functionality of a forwarder is the functionality of a visa service or a component of a physically distributed visa service, including the functions of the internal dock, adaptor and tie-in required for the visa service to communicate with a forwarder in the device.

Another optional addition to either a forwarder device or a dock device that includes the functionality of a forwarder is the functionality of a admin service or a component of a physically distributed admin service, including the functions of the internal dock and adapter required for the admin service to communicate with a forwarder in the device. Such an addition may include an internal clock. It may also include an additional physical interface for the startup channel such as an Ethernet connection. Preferably the use of this physical interface requires an access tool or tools such as one or more physical keys.

Another SNS device is a hardware unit, called an adaptor device, that implements the functionality of an adaptor and enables tie-ins to a dock external to the device through dock-facing interfaces that facilitate the use of wired or wireless connections as its means for communicating with docks. An adaptor device also has agent-facing interfaces that facilitate the use of wired or wireless connections or interaction interfaces as its means for communicating with an agent or assisting in determining and authenticating the identity of an agent. For example, each of these interfaces may be an Ethernet, cellular or Wi-Fi interface. A single interface may serve as both a dock-facing and an agent-facing interface.

An optional addition to an adaptor device is a means of bypass that identifies entering packets with specific characteristics, such as a destination addresses in a certain range, sends matching packets through the adaptor, and bypasses packets that do not. Such a means of bypass may also include a means of merging the packets that pass through the adaptor and those that bypass the adaptor onto a single packet stream. Such a means of bypass may be used for packets flowing between a dock-facing interface and an agent-facing interface to selectively bypass the adaptor.

Another optional addition to an adaptor device is a firewall that identifies and discards packets with specific characteristics.

Another optional addition to an adaptor device is a means of assisting in determining and authenticating the identity attributes of an agent through interaction interfaces.

Another optional addition to an adaptor device is a means of communicating through interfaces to other devices to assist in determining and authenticating attributes of agents' identities.

Another optional addition to an adaptor device is a means that implements the functionality of a phone, video game, security camera, personal computer, or other type of appliance that may be facilitated by means of communication through an SNN.

Another SNS device is a hardware unit, called a SNS native device, that implements the functionality of an adaptor, an internal dock, and a tie-in between them. In addition to the normal function of these components, a SNS native device implements the functionality of a phone, video game, security camera, personal computer, or other type of appliance that may be facilitated by means of communicating directly with an SNN via a link. It includes SNN-facing interfaces that facilitate the use of wired or wireless connections as a means for dock communication with the internal communications system of the SNN. Preferably, the admin of an SNS has a means of controlling the configuration of a SNS native device that connects to an SNS administered by that admin.

Another optional addition to any SNS device is a means of assisting the admin service in authenticating the device, such as secret internal information or a cryptographically signed certificate tied to the hardware serial number of the device.

Another optional addition to any SNS device is a means of proving a factor of the identity of a programmer that has access to the device, such as a keypad, a card reader, a facial recognition system, or a fingerprint reader, as a condition of programming the device or use of one or more physical interfaces on the device.

An optional addition to any SNS device that includes the functionality of a forwarder is the functionality of additional forwarders, connected directly or indirectly to the first forwarder by internal links and communicating with SNN-facing interfaces.

An optional addition to any SNS device that includes the functionality of a dock or an adaptor is a means of authenticating agent communication through the device, such as secret internal information or a means of verifying the hardware serial number of a device, to facilitate agents proving that they are communicating through the device as an attribute of their identity.

Another optional addition to any SNS device is a means of determining the physical location of the device, such as a Global Positioning System receiver. If the device includes the functionality of an adaptor, this allows the adaptor to provide the physical location as an identity attribute of agents communicating through the device. If it includes the functionality of a node this enables the device to enforce policies that depend on the location of the node. And alternate means of determining the physical location of a device is attempting local communication with other devices that are expected to be in the vicinity, for example, through the local Wi-Fi, Bluetooth, or Radio Frequency Identification (RFID). This method may be used with devices that are expected to be nearby for other reasons, or other devices specifically for this purpose may be hidden in the expected vicinity.

Exemplary Arrangements of SNS Devices

One skilled in the art will appreciate that the hardware units, including SNS devices, that implement the components of a SNS may be arranged to attain numerous and varied embodiments of the invention.

Figure 12:
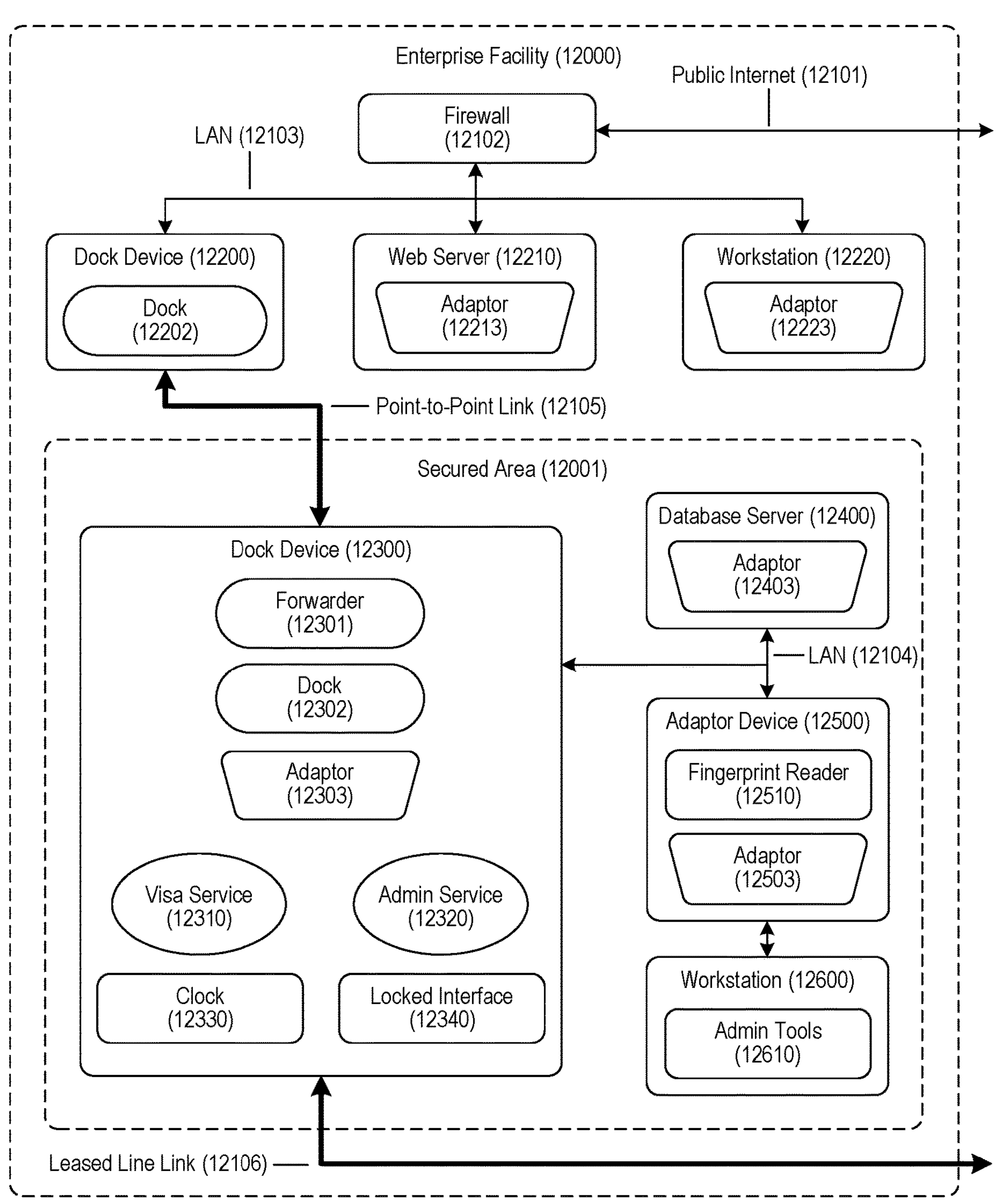
FIG. 12 shows an exemplary enterprise facility incorporating a SNS, in accordance with an embodiment of the present disclosure.

FIG. 12 shows an exemplary enterprise facility incorporating a SNS according to an embodiment of the invention. The exemplary enterprise facility 12000 is connected to the public Internet 12101 through a conventional firewall 12102. A private local area network (LAN) 12103 within the facility is used to connect a workstation 12220 and a web server 12210 within the facility to the public Internet through the firewall.

The web server communicates both with the public Internet and with a protected database server 12400 inside a physically secure area 12001 within the enterprise facility. To communicate with the database server through the SNN of the SNS, the web server uses an adaptor 12213 loaded into its operating system to establish a tie-in (not shown) through the LAN to a dock 12202 within a dock device 12200. The dock communicates via a link 12105 over a point-to-point connection with a forwarder 12301 on another dock device 12300 within the secure area. The forwarder communicates via a link (not shown) with a dock 12302 on the dock device 12300. Finally, the dock 12302 communicates with the database server via a tie-in (not shown) established through the LAN 12104 between the dock and an adaptor 12403 loaded into the operating system of the database server. Using an adaptor 12223, the workstation communicates with the protected database server in a similar manner.

The dock device 12300 within the secure area also includes a visa service 12310, an admin service 12320 with a clock 12330, and an adaptor 12303 that allows the visa service and admin service to establish tie-ins with the dock 12302. As noted above, the dock 12302 of the dock device within the secure room is used to communicate over the SNN with the database server 12400 and any other devices within the secure area. For example, using an adaptor 12503 on an adaptor device 12500, a workstation 12600 with the admin tools 12610 used by an admin establishes a tie-in (not shown) through the LAN 12104 to the dock 12302. The adaptor 12503 facilitates the use of a fingerprint reader 12510 on the adaptor device to acquire the fingerprint of the admin an authenticate the admin. The admin also has a means to change the firmware of the dock device 12300 through a physically locked interface 12340 that is normally locked and unconnected.

The forwarder 12301 within dock device 12300 is also linked to one or more forwarders in similar facilities throughout the enterprise through links over leased lines 12106. Because these links and the link 12104 are the only means of communicating in and out of the secure area, all such communication is governed by the policies of the SNS.

The fingerprint identifiers in the admin's home and on the managed mobile phone illustrate how SNS devices can facilitate user authentication.

Figure 13:
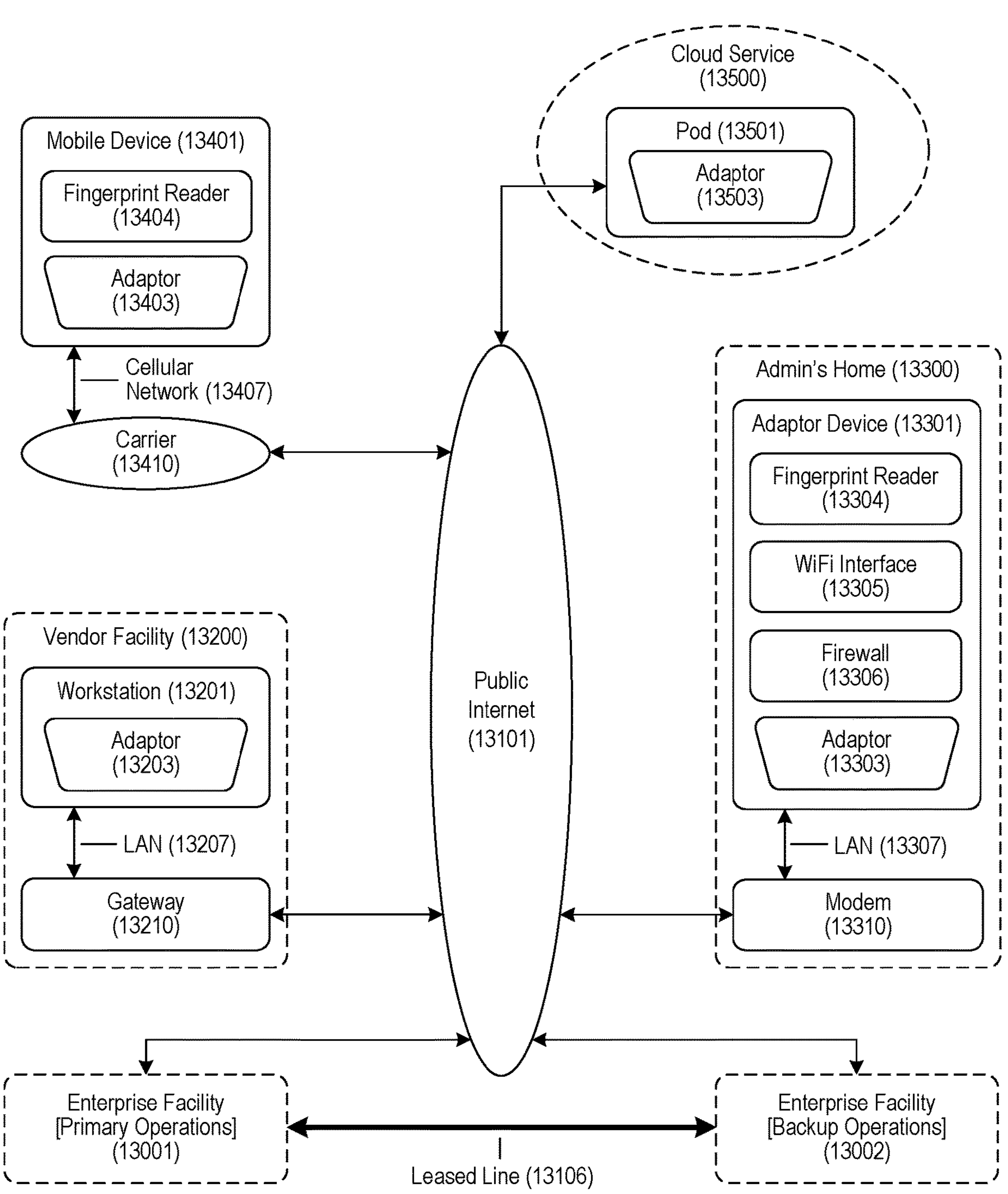
FIG. 13 shows two of the enterprise facilities of FIG. 12 using the SNS to communicate with each other and other enterprise resources, in accordance with an embodiment of the present disclosure.

FIG. 13 shows two of the enterprise facilities of FIG. 12 using the SNS to communicate with each other and other enterprise resources according to an embodiment of the invention. Specifically, the enterprise facilities 13001 and 13002 communicate with one another via a leased line 13105. The enterprise facilities communicate with a vendor facility 13100, an admin's home 13200, a managed mobile device 13401, and a cloud-based service 13500 via the public Internet 13101.

Each of these other enterprise resources uses an adaptor to establish a tie-in to the dock 12202 of one or both of the enterprise facilities. The vendor facility includes a workstation 13201 with an adaptor 13203 that establishes the tie-in through a gateway 13210 to which it is connected via a LAN 13207. The admin's home includes an adaptor device 13301 with an adaptor 13303 that establishes the tie-in through a modem 13310 to which it is connected via a LAN 13307. The managed mobile device 13401 includes an adaptor 13403 that establishes the tie-in through a carrier 13410 to which it is connected via a cellular network 13407. The cloud service 13500 includes a pod 13501 of resources sharing an adaptor that establishes the tie-in directly through the public Internet. The adaptor device 13301 in the admin's home also includes a WiFi interface 13305 and a firewall 13306 that facilitate communication with other devices within the home.

Finally, several of the other enterprise resources includes a means for authentication. Specifically, the adaptor device 13301 at the admin's home 13300 and the phone 13401 of the managed mobile phone 13400 includes fingerprint readers 13304 and 13404 with which the respective adaptors 13303 and 13403 can facilitate authentication.

Example Processing System

Figure 14:
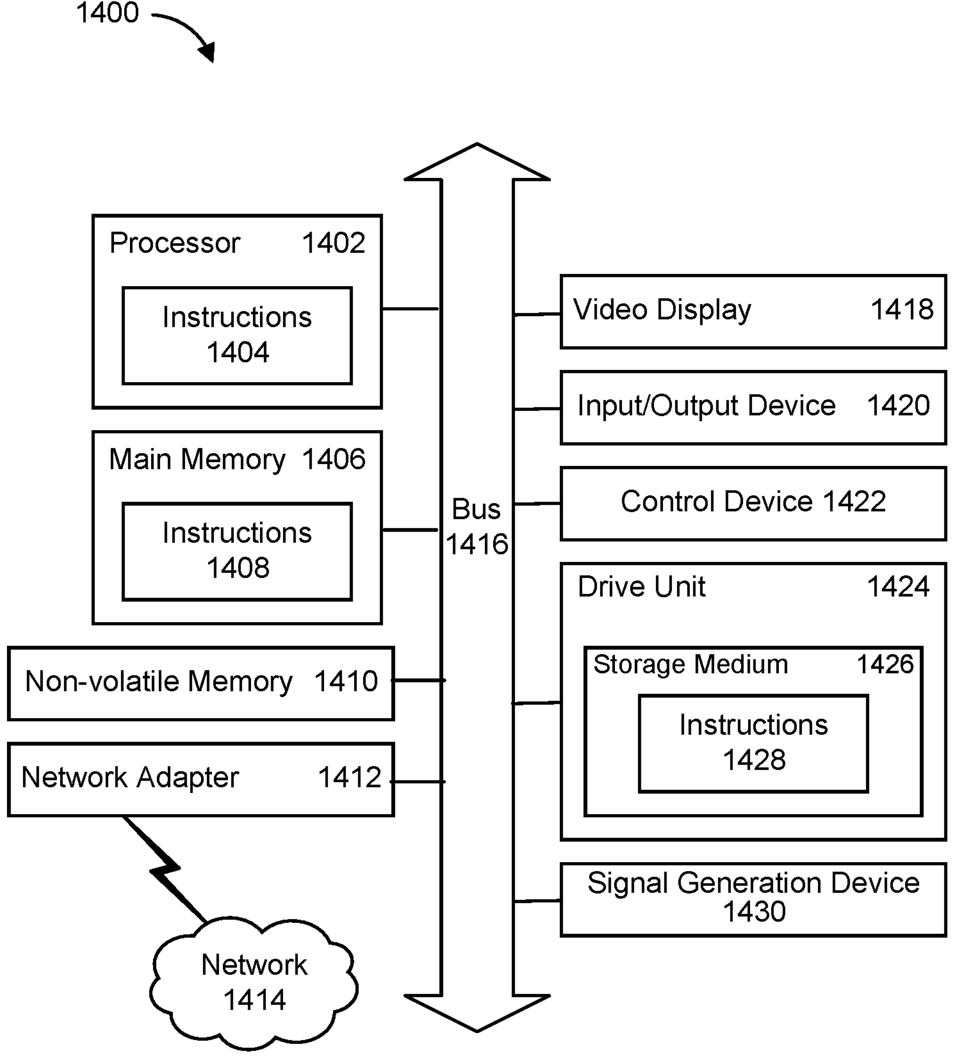
FIG. 14 is a block diagram illustrating an example of a processing system 1400 in which at least some operations described herein can be implemented.

FIG. 14 is a block diagram illustrating an example of a processing system 1400 in which at least some operations described herein can be implemented. As shown in FIG. 14, the processing system 1400 may include one or more central processing units ("processors") 1402, main memory 1406, non-volatile memory 1410, network adapter 1412 (e.g., network interfaces), video display 1418, input/output devices 1420, control device 1422 (e.g., keyboard and pointing devices), drive unit 1424 including a storage medium 1426, and signal generation device 1430 that are communicatively connected to a bus 1416. The bus 1416 is illustrated as an abstraction that represents any one or more separate physical buses, point to point connections, or both connected by appropriate bridges, adapters, or controllers. The bus 1416, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the processing system 1400 operates as part of a user device, although the processing system 1400 may also be connected (e.g., wired or wirelessly) to the user device. In a networked deployment, the processing system 1400 may operate in the capacity of a server or a client machine in a client-server network environment, or as a peer machine in a peer-to-peer (or distributed) network environment.

The processing system 1400 may be a server computer, a client computer, a personal computer, a tablet, a laptop computer, a personal digital assistant (PDA), a cellular phone, a processor, a web appliance, a network router, switch or bridge, a console, a hand-held console, a gaming device, a music player, network-connected ("smart") televisions, television-connected devices, or any portable device or machine capable of executing a set of instructions (sequential or otherwise) that specify actions to be taken by the processing system 1400.

While the main memory 1406, non-volatile memory 1410, and storage medium 1426 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 1428. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 1404, 1408, 1428) set at various times in various memory and storage devices in a computer, and that, when read and executed by one or more processing units or processors 1402, cause the processing system 1400 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. For example, the technology described herein could be implemented using virtual machines or cloud computing services.

Further examples of machine-readable storage media, machine-readable media, or computer-readable (storage) media include, but are not limited to, recordable type media such as volatile and non-volatile memory devices 1410, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 1412 enables the processing system 1400 to mediate data in a network 1414 with an entity that is external to the processing system 1400 through any known and/or convenient communications protocol supported by the processing system 1400 and the external entity. The network adapter 1412 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1412 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

From the foregoing, it will be appreciated that specific embodiments of the device have been described herein for purposes of illustration, but that various modifications may be made without deviating from the scope of the device. Accordingly, the device is not limited except as by the appended claims.

The invention claimed is:

1. A secure communication system enabling secure transport of information comprising:

a secure network comprising one or more nodes communicatively coupled by an internal communication system; and a set of policies, wherein said secure network internally transports said information in the form of internal packets, wherein said policies specify agents that are permitted to communicate through said secure network, wherein said internal packets include herald packets and transit packets, wherein each of said internal packets is associated with a visa, wherein said visa references said policies, wherein a node among said one or more nodes transmits a transit packet only if allowed by said policies as referenced by said visa, wherein said transit packet carries communications between at least two of said agents through said secure network, wherein a herald packet associated with said visa distributes said visa to said one or more nodes prior to transmission of said transit packet, and wherein said herald packet includes a hop count that is decremented when said herald packet is transmitted.

2. The secure communication system of claim 1, wherein said visa is associated with at least one policy enforcement procedure compiled from said policies, and wherein said node applies said policy enforcement procedure to enforce said policies.

3. The secure communication system of claim 1, wherein if transmission of said transit packet is not allowed by said policies, said node discards said transit packet.

4. The secure communication system of claim 1, wherein said policies allow said node to transmit said transit packet based upon any of:

the identity of an agent, among said agents, that is a source of said information, and the identity of an agent, among said agents, that is a destination of said information.

5. The secure communication system of claim 1, wherein said visa is issued by a visa service within said secure network.

6. The secure communication system of claim 5, wherein said visa service issues said visa only if it successfully authenticates the identity of each of said agents.

7. The secure communication system of claim 6, wherein said identity is authenticated only if a corresponding agent demonstrates access to one or more required credentials, and wherein said required credentials are determined based on said policies.

8. The secure communication system of claim 1, wherein said visa is associated with a compliant flow, and wherein said compliant flow is a stream of communication, allowed by said policies, that carries said internal packets between one of said agents and another of said agents.

9. The secure communication system of claim 1, wherein an agent among said agents establishes, via an adaptor, a tie-in to a dock among said one or more nodes, and wherein said tie-in is a reliable and secure channel of communication between said agent and said secure network through which said agent can send or receive said information.

10. The secure communication system of claim 9, wherein said dock receives said information from an agent, via said adaptor, as agent packets, wherein said dock converts an agent packet to said transit packet, and wherein said visa is associated with said transit packet upon conversion.

11. The secure communication system of claim 10, wherein at least one of said internal packets or said agent packets comprise Internet Protocol packets.

12. The secure communication system of claim 1, wherein said information is transmitted through a tether, wherein said tether is a distinguishable stream that passes through said tie-in, and wherein said dock assigns said tether a tether address.

13. The secure communication system of claim 12, wherein said tether address is not visible outside of said secure network.

14. The secure communication system of claim 1, wherein said policies allow said node to transmit said transit packet based upon any of:

a tether address, associated with an agent among said agents, that is the source of said information within said transit packet, and a tether address, associated with an agent among said agents, that is the destination of said information within said transit packet.

15. The secure communication system of claim 1, wherein said visa is associated with each of said internal packets by a visa identifier within each of said internal packets.

16. The secure communication system of claim 1, wherein each of said internal packets is associated, via said visa, with a configuration of said secure network, and wherein said configuration comprises said policies.

17. The secure communication system of claim 16, wherein an administrator of said secure network concurrently designates a first configuration as active and a second configuration as testing, and wherein both said first configuration and said second configuration are concurrently valid configurations.

18. The secure communication system of claim 17, wherein said policy enforcement procedure is defined within said first configuration and within said second configuration, wherein said node processes said internal packets under both said first configuration and said second configuration, and wherein said node reports discrepancies between processing said internal packets under said first configuration and said second configuration.

19. The secure communication system of claim 18, wherein upon applying said policy enforcement procedure, said node references state information associated with said node.

20. The secure communication system of claim 19, wherein said state information comprises any of: an address within said internal communication system, a physical location of a hardware unit on which the node resides, an authentication status of an agent that is the source of destination of said information, a fullness status of buffers, information obtained from a trust evaluation service, an availability of resources within allocation pools, and a representation of the current time.

21. A secure communication system comprising:

a secure network, two or more agents sending and receiving information through said secure network, and a set of policies, wherein said secure network establishes one or more compliant flows between said agents, wherein said policies specify which of said agents are permitted to communicate through said secure network, wherein each of said compliant flows is a stream of communication, allowed by said policies, that carries said information between one of said agents and another of said agents, wherein said secure network internally transports said information in the form of internal packets including herald packets and transit packets, wherein each of said internal packets is associated with a visa that references said policies, wherein said transit packet carries communications associated with said compliant flows between said agents, wherein a herald packet associated with said visa distributes said visa prior to transmission of said transit packet, and wherein said secure network enforces a hop count associated with each of said compliant flows, said hop count being decremented when said herald packet is transmitted.

22. The secure communication system of claim 21, wherein said visa is associated with said compliant flow.

23. The secure communication system of claim 21, wherein said secure network comprises one or more nodes, and wherein a node among said one or more nodes transmits said transit packet only if allowed by said policies as referenced by said visa.

24. The secure communication system of claim 21, wherein said compliant flow persists until an expiration time indicated by said visa.

25. The secure communication system of claim 21, wherein said policies limit any of: a rate, and a volume of said information that said secure network transports within said compliant flow.

26. The secure communication system of claim 21, wherein said herald packet is transmitted only if said hop count is greater than zero.

27. The secure communication system of claim 21, wherein upon receiving said visa from a visa service, said hop count is set to a maximum allowed number of links of said secure network that said herald packet is permitted to traverse.

* * * * *